US008688726B2

(12) United States Patent
Mahajan et al.

(10) Patent No.: US 8,688,726 B2
(45) Date of Patent: Apr. 1, 2014

(54) LOCATION-AWARE APPLICATION SEARCHING

(75) Inventors: Milind Mahajan, Redmond, WA (US); Amit Kumar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 55 days.

(21) Appl. No.: 13/398,342

(22) Filed: Feb. 16, 2012

(65) Prior Publication Data

US 2012/0284256 A1  Nov. 8, 2012

Related U.S. Application Data

(63) Continuation-in-part of application No. 13/102,536, filed on May 6, 2011.

(51) Int. Cl.
*G06F 17/30* (2006.01)
(52) U.S. Cl.
USPC ......... 707/763; 707/706; 707/758; 455/456.1
(58) Field of Classification Search
None
See application file for complete search history.

(56) References Cited

U.S. PATENT DOCUMENTS

| 7,774,022 | B2 | 8/2010 | Kawamoto | |
|---|---|---|---|---|
| 8,229,458 | B2* | 7/2012 | Busch | 455/456.1 |
| 8,396,888 | B2* | 3/2013 | Cheng et al. | 707/774 |
| 8,437,776 | B2* | 5/2013 | Busch | 455/456.1 |
| 8,487,331 | B2* | 7/2013 | Jang et al. | 257/98 |
| 2003/0236095 | A1* | 12/2003 | Ross | 455/456.1 |
| 2004/0024846 | A1 | 2/2004 | Randall et al. | |
| 2004/0034853 | A1 | 2/2004 | Gibbons et al. | |
| 2004/0171379 | A1 | 9/2004 | Cabrera et al. | |
| 2005/0160107 | A1 | 7/2005 | Liang | |
| 2007/0061245 | A1 | 3/2007 | Ramer et al. | |
| 2007/0067272 | A1 | 3/2007 | Flynt et al. | |
| 2007/0088686 | A1 | 4/2007 | Hurst-Hiller et al. | |

(Continued)

FOREIGN PATENT DOCUMENTS

| EP | 1320270 A1 | 6/2003 |
|---|---|---|
| EP | 1462999 A2 | 9/2004 |
| KR | 1020100066827 A | 6/2010 |
| KR | 1020110006259 A | 1/2011 |

OTHER PUBLICATIONS

Matthias, "Appazaar", Retrieved on: Aug. 31, 2011, 10 pages Available at: http://www.appazaar.net/.

(Continued)

*Primary Examiner* — Hung Le
(74) *Attorney, Agent, or Firm* — Dave Ream; Briam Haslam; Micky Minhas

(57) ABSTRACT

Computer-readable media, computer systems, and computing methods are provided for implicitly discovering applications that have a corresponding location. Initially, an application manifest is constructed that maintains a mapping between apps and their respective geographic boundaries. In operation, upon detecting a location signal being transmitted from a mobile device, the location signal is employed to identify a set of valid applications. Generally, the location signal represents location-based information entered to or received from the mobile device. Identifying the set of valid applications involves comparing the location signal against the application manifest and, based on the comparison, designating those apps that are mapped to geographic boundaries that meet the location signal as the set of valid applications. Upon identifying the set of valid applications, a selection of apps included within the set of valid applications is sent to the mobile device for display to the user within a operational context.

20 Claims, 19 Drawing Sheets

(56) References Cited

U.S. PATENT DOCUMENTS

| | | | |
|---|---|---|---|
| 2007/0138268 A1* | 6/2007 | Tuchman | 235/383 |
| 2007/0185785 A1 | 8/2007 | Carlson et al. | |
| 2007/0208719 A1 | 9/2007 | Tran | |
| 2009/0111487 A1* | 4/2009 | Scheibe | 455/456.6 |
| 2010/0030624 A1 | 2/2010 | Vanska et al. | |
| 2010/0070342 A1* | 3/2010 | Hu et al. | 705/10 |
| 2010/0094707 A1* | 4/2010 | Freer | 705/14.54 |
| 2010/0100839 A1 | 4/2010 | Tseng et al. | |
| 2010/0159943 A1* | 6/2010 | Salmon | 455/456.1 |
| 2010/0174572 A1* | 7/2010 | Joseph et al. | 705/7 |
| 2010/0293586 A1 | 11/2010 | Rodrigues et al. | |
| 2011/0131235 A1 | 6/2011 | Petrou et al. | |
| 2011/0173569 A1 | 7/2011 | Howes et al. | |
| 2011/0276396 A1 | 11/2011 | Rathod | |
| 2012/0023088 A1* | 1/2012 | Cheng et al. | 707/707 |
| 2012/0088487 A1* | 4/2012 | Khan | 455/418 |
| 2012/0238504 A1* | 9/2012 | Moyer et al. | 514/18.1 |
| 2012/0246170 A1 | 9/2012 | Iantorno | |
| 2012/0303455 A1* | 11/2012 | Busch | 705/14.57 |
| 2012/0329482 A1* | 12/2012 | Chandra et al. | 455/456.2 |
| 2013/0173577 A1* | 7/2013 | Cheng et al. | 707/706 |

OTHER PUBLICATIONS

"Appsfire: Hot Apps & Free Apps", Retrieved on: Sep. 1, 2011, 2 pages Available at: http://www.appbrain.com/app/appsfire%3A-hot-apps-free-apps/com.appsfire.appsfire.

Hoogsteder, Vincent, "Google Android Market Goes Local", Retrieved on: Sep. 1, 2011, 3 pages Available at: http://www.distimo.com/blog/2011_07__google-android-market-goes-local/.

PCT ISR US 2013/025476, m. Jun. 10, 2013, 13 pp.

Non-Final Office Action, USPTO mailed Apr. 11, 2013, U.S. Appl. No. 13/102,536, 29 pp.

* cited by examiner

GOURMET CHICKEN PIZZA RECIPE – ALLRECIPES.COM
USER RATING: 4.5/5 – 22 PHOTOS – 521 REVIEWS
PIZZA GETS A LITTLE STYLE WITH CHOPPED TOMATOES REPLACING SAUCE, AND THE ADDITION OF RANCH DRESSING AND SHREDDED CHICKEN
ALLRECIPES.COM/RECIPE/GOURMET-CHICKEN-PIZZA/DETAIL.ASPX – MARK AS SPAM

CHICKEN GARLIC PIZZA RECIPE – ALLRECIPES.COM
USER RATING: 4.5/5 – 11 PHOTOS – 187 REVIEWS
A DELICIOUS OPTION FOR HOMEMADE PIZZA! BUTTER GARLIC SAUCE, CHICKEN, TOMATO, AND RICOTTA AND PARMESAN CHEESES ARE BAKED TOGETHER FOR A DELIGHTFULLY LIGHT PIZZA
ALLRECIPIES.COM/RECIPE/CHICKEN-GARLIC-PIZZA/DETAIL.ASPX – MARK AS SPAM

CHICKEN PESTO PIZZA RECIPE – ALLRECIPES.COM
USER RATING: 4.6/5 – 10 PHOTOS – 162 REVIEWS
EASY PIZZA DINNER THAT USES CHICKEN AND PESTO FOR A GREAT MEAL. IF FONTIA IS NOT AVAILABLE AT YOUR STORE, JUST SUBSTITUTE MOZZARELLA.
ALLRECIPIES.COM/RECIPE/CHICKEN-PESTO-PIZZA/DETAIL.ASPX – MARK AS SPAM

SHOW ONLY RESULTS FROM ALLRECIPES.COM

LEARN CHICKEN PIZZA RECIPE ON COOKING MAMA
LEARN A DELICIOUS CHICKEN PIZZA RECIPE IN 15 MINUTES. LET COOKING MAMA TEACH YOU HOW TO....
APP://COOKING MAMA/RECIPIES/CHICKENPIZZA

CROCKPOT PIZZA CHICKEN RECIPE – SLOW COOKER ENTRÉE POULTRY RECIPES ...
CROCKPOT PIZZA CHICKEN IS AN EASY RECIPE. THIS FLAVORFUL CHICKEN BREAST RECIPE IS MADE WITH JUST FIVE INGREDIENTS IN YOUR CROCKPOT INCLUDING PIZZA CHEESE AND PASTA SAUCE.
BUSYCOOKS.ABOUT.COM/OD/CHICKENRECIPE1/R/PIZZACHIX.HTM – MARK AS SPAM

CHICKEN PIZZA RECIPE | GROUP RECIPES
OUR MOST TRUSTED CHICKEN PIZZA RECIPES. REVIEWED BY MILLIONS OF HOME COOKS.

SEARCH ENGINE | NEW YORK

WEB | PLACES  IMAGES  VIDEOS  MORE▼

ALL RESULTS      1-10 OF 1,430,000,000 RESULTS - ADVANCED

NEW YORK. NEW YORK TRAVEL GUIDE – SEARCH ENGINE TRAVEL
EXPLORE TOP ATTRACTIONS AND PHOTOS. FIND GREAT DEALS ON FLIGHTS AND HOTELS.
MAP - HOTELS - FLIGHTS - ATTRACTIONS - EVENTS - RESTAURANTS

80 F    ATTRACTIONS
MOSTLY CLOUDY    TIMES SQUARE
       CENTRAL PARK
$340
SEA > JFK    ST. PATRICK'S CATHEDRAL

HI, PLANNING A TRIP TO NEW YORK? I HAVE FOUND SPECIFIC APPS FOR YOUR WP7 THAT CAN HELP YOU PLAN AND ENJOY A PERFECT TRIP THERE

| GUIDES | NEWS & WEATHER | DINING | ACTIVITIES | MORE |

NYC TRANSIT - FREE
FREE ★★★★☆
BY BINARY RED

NEW YORK SUBWAY SCHEDULE   $0.99
NYC TRANSIT   $0.99
NYC MAPS   $0.99
MY SUBWAY NYC

** VERSION 1.1 – THE SUBWAY LOCATOR FEATURE IS NOW AVAILABLE TO FREE USERS. THE FREE VERSION OF NYC TRANSIT IS YOUR GUIDE TO

SAMPLE QUERIES
NEW YORK
HAWAII
SINGAPORE
LONDON
SYDNEY
HYDERABAD
BEIJING
VANCOUVER, CANADA
DUBLIN
AGRA, INDIA

RELATED SEARCHES
NEW YORK WEATHER FORECAST
NEW YORK GIANTS FOOTBALL
NEW YORK ATTRACTIONS
NEW YORK EARTHQUAKE
NEW YORK LOTTERY
NEW YORK CITY
HOTELS IN NEW YORK
JOBS IN NEW YORK

LOCATION-AWARE APPLICATION SEARCHING

CROSS-REFERENCE TO RELATED APPLICATIONS

This application is a continuation-in-part of prior U.S. application Ser. No. 13/102,536 filed May 6, 2011, entitled "INTEGRATING APPLICATIONS WITHIN SEARCH RESULTS," herein incorporated by reference.

BACKGROUND

Applications, or "apps" as used herein, are becoming more available on across Internet and are ubiquitous on mobile devices (e.g., laptops, touch-screen devices, mobile phones, and other hand-held devices). More and more users are using applications for their day to day tasks. But, discovering an appropriate set of apps during a mobile activity remains non-intuitive and time-consuming, if possible at all. In one instance, when a user is visiting a particular location (e.g., Los Angeles), there presently exists no routines that help to identify whether there are any apps related to local tours and guides, overnight accommodations, places for dining, local news and activities, etc. that are associated with the particular location.

In another instance, if a user is physically close to a point of interest (e.g., Disneyland), there presently exists no routines that help to identify whether there are any apps related to the point of interest. For example, with reference to the Disneyland point of interest, conventional mobile devices do not offer the user information relevant to Disneyland, such as things to do (e.g., a Disney® rides app), ways to save time and money, customer reviews of local businesses, or online reservation service (e.g., OpenTable®).

Further, because there are many apps that are applicable to a particular location or point of interest, apps that are relevant to a user at the particular location likely differ depending on a profile of the user. In one instance, if the user is recognized to be near a business (e.g. Best Buy®), there presently exists no way to discover whether there is an app currently developed that might help the user save time and money by surfacing apps related to the business (e.g., a daily discount app). In another instance, if the profile of a user indicates that the user is an individual who is a resident of certain city (e.g., Los Angeles), there exists no routine that distinguishes between tourism apps that are helpful to a visitor of the certain city and localized apps that are helpful to a resident of that city. In another instance, a first-time customer of Best Buy® or first-time visitor of Disneyland® may desire different apps than someone who is a frequent visitor; yet, no present routine is able to satisfy these customer/visitor requirements. Accordingly, technology that organizes apps, once the apps are discovered, would allow users to quickly and intuitively navigate through the available apps.

SUMMARY

This Summary is provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

Embodiments of the present application introduce technology for discovering applications that relate to search results generated in response to a query entered by a user and for integrating those applications within the search results to assist the user in fulfilling a pending task. The terms "applications" and "apps" are used interchangeably herein and broadly pertain to application software designed to be executed by an operating system hosted on a computing device and to assist the user in performing a singular or multiple related specific tasks. In operation, apps provide digital solutions in the real world, such as word processing, gaming, communication-based interfaces, etc. Examples of apps include enterprise software, accounting software, office suites, graphics software, and media players. These apps, or application software, as contrasted with operating system software or middleware, which manage and integrate a computer's capabilities, but typically do not directly apply them in the performance of tasks that benefit the user. It should be understood and appreciated that the definition of apps is not limited to the scope of examples provided herein and may include any code that carries out one or more operations when executed.

Initially, embodiments of the present invention involve building and maintaining a registry of apps that may be mapped in some manner to search results. This registry may be persisted in a data store and indexed via an application manifest, which is accessible to search engine(s). Various criteria or attributes of the search results may be used to map the search results to one or more apps. In one instance, an attribute of a search result may be the uniform resource locator (URL) or a uniform resource identifier that directs a user to a website or web page associated with the search result. In another instance, a criterion may be a declaration provided by an app developer that points to a set of individual search results or a category of search results (e.g., entities or entity classes) that are previously deemed relevant to the app. In yet another instance, attributes of the search results may be extracted from the search result's title, description, and/or metadata, while a service may be employed to construct links between these attributes and various apps. That is, in embodiments, terms or phrases from content of a web page may be applied to discover relevant apps, as opposed to simply using terms and phrases from a query. In still another instance, metadata expressed by a search result, such as website capabilities or a predefined correlation to abstract object(s) (e.g., tasks, entity actions, and the like) may be relied on to narrow a field of available apps to those that likely correspond to a user's searching intent.

During a search event (e.g., upon receiving a query at a web browser or other graphical user interface (GUI)), the search engine is enabled to generate search results from the query and compare the search results against the application manifest in order to discover relevant apps. Although the interaction between the search engine and the application manifest, described in more detail below, is provided as an exemplary embodiment throughout, other embodiments of the present invention contemplate leveraging differing technologies for discovering relevant apps. By way of example, a protocol that operates similarly to a domain name server (DNS) technology may be utilized for locating, downloading, and installing applications on the user's device. In this case, the protocol employs terms or phrases parsed from the search result, or underlying website, to conduct an online search for apps (e.g., app database, app catalogue, or app store), or perform a local search within an inventory of installed apps on the user's device.

Upon identifying a group of relevant apps, these apps may be ranked according to any metrics that can be used to sort and/or organize information. Generally, ranking involves ranking apps in relation to other apps using such metrics as popularity of the apps, where popularity may be derived from various sources. These sources used for ranking may include specific services, such as social networks, recommendations from other users, crowd-source ratings, and reviews. Upon establishing the ranking, a threshold that limits the number of apps to the highest ranked apps (e.g., specific level of relevance) may be implemented. In one instance, the threshold is based, in part, upon space allocated on a search-results page for apps.

The highest ranked apps are then placed, or embedded, within the search results (see e.g., FIGS. 5-8). In one embodiment, placement involves presenting a representation of the app proximate to a search result that has parity with the app in order to indicate to the user the rationale for selecting the app. In another embodiment, placement involves exposing the app in a pop-up window on top of content within a web page when a term or phrase is selected within the content. Other embodiments are described herein, which provide non-limiting examples of schemes for surfacing the apps to a user on a GUI.

Upon detecting a user-initiated selection of the app within the displayed search results, one or more actions may occur. For instance, if the app is not recognized as residing within the inventory of the user's device, the search engine may navigate the user to an app store, thereby prompting the user to purchase the relevant app. However, if the app is recognized as being listed in the device's inventory (i.e., previously installed on the device), the search engine may automatically launch the app. In this way, the user is saved the steps of manually locating and starting the app. In an exemplary embodiment, these actions may be offered as options that are visually presented near a representation of the app that is surfaced within the search results.

In the instance that the app is launched from the search results, context of the user's search may be passed from the search engine to the app for current or future use. This context may be passed as parameters that represent various aspects of the user's search, such as content of a search-results page, query keywords, navigation events, link-selection history, user profile data, or other search-behavior information. By way of example, the query keywords "restaurants in Seattle" may be converted into parameters in order to call a launched app (e.g., Yelp® app) to an entry point (e.g., specific feature or task level) that is ostensibly relevant to the user's overarching intent (i.e., planning a dinner in Seattle), as opposed to forcing the user to navigate through the app with the same search criteria previously entered at the search engine.

There are a variety of ways these parameters may be passed from the search engine to the app. In one instance, the parameters may be tailored based on expectations of the app. By way of example, the search engine may be enabled to recognize an appropriate format that each individual app prefers when receiving parameters. The search engine may then perform the appropriate formatting by carrying out certain operations on the query keywords, for example. These operations may include parsing the query keywords into terms and categorizing the terms to correspond with a predetermined input structure of the app. This process of parsing and characterizing enables either the search engine or the app to efficiently populate the appropriate terms into appropriate entry locations of the app's input structure.

Although various different approaches for passing parameters (representing context of a user's search) have been described, it should be understood and appreciated that other types of suitable ways of passing parameters that guide an app to an entry point may be used, and that embodiments of the present invention are not limited to simply parsing, catego-rizing, and populating as described herein. For instance, if an identifier (ID) of a business is extracted from query keywords that are submitted by a user, a specialized URL associated with the business ID may be discovered and provided to the app, where the specialized URL may guide the app to launch at a entry point relevant to the business being searched.

Upon launching the app at an entry point (e.g., in accordance with context of a user's search), the user may interact with the app for a period of time prior to returning to conduct further searches on the search engine. These interactions may be recorded in a user-interaction log at the app and may be, at some point, passed to the search engine for customizing the user's continued search. For instance, incident to completing a computing session with an app, the app may transfer the user-interaction log to the search engine upon the user returning to the search engine. Once in the possession of the user-interaction log, the search engine may employ some or all the information within the log to help refine the user's experience when conducting additional searches in a number of ways. This refinement may include, in embodiments, the search engine automatically (actively) resubmitting a new query that incorporates information from the log or selectively (passively) using the information from the log to modify subsequent searches.

As such, the technology introduced by embodiments of the present invention allow for expanding on a query to carry out a broad task of searching for apps, for integrating the apps within the search results that are responsive to the query, and, upon launching an app from the search results, for enabling a search engine to pass data to and receive data from the launched app.

Additional technology introduced by embodiments of the present invention provide a platform to discover, rank, and surface apps using local intent. As used herein, the phrase "local intent" is not meant to be limiting, but may encompass any position-based information that provides a indicia of a location that is relevant to the application, such as the current physical location that owns or supports aspects (e.g., sales) of the app, point-of-interest (POI) that are described by the app, or businesses/entities proximate to a particular geographic point covered by the app. Further, the local intent may encompass other position-based information, such as travel-related data (e.g., POI of a vacation destination), tourism-related data (e.g., landmarks contained within a city), or any other data that can be identified as having a location component.

Once the local intent is identified for a particular app, the app may be automatically "geofenced" based on location-based information and categorized according to the geofence as well as other criteria (e.g., user-implemented tasks supported by the app). In embodiments, geofencing relates to the process of determining one or more geographic regions that are pertinent to a particular app as a function of the local intent and mapping the particular app to those geographic region(s). In one instance of geofencing, the local intent discovered for a Seattle taxi-service app may indicate that the app should be linked with a boundary around the city of Seattle. In another instance of geofencing, the local intent discovered for a Washington trail-guide app may indicate that the app should be linked with a boundary around the state of Washington. Accordingly, the taxi-service app may be categorized as a city-level app that is related to the city of Seattle, while the trail-guide app may be categorized as a state-level app that is related to Washington state. Further, with respect to categorization by task, the taxi-service app may be categorized as a public-transportation service, while the trail-guide app may be categorized as a outdoor-recreation service.

In embodiments, the processes of geofencing and categorizing are performed offline in order to build a manifest that represents a mapping between apps and entities, such as location and/or task. Another offline process, in one embodiment, involves initially ranking the apps within a common category. In yet another embodiment, ranking involves includes an online process that dynamically ranks the apps within a given category dynamically during runtime as a function of location signals and/or task signals conveyed from a mobile device.

In addition to ranking, the apps can be dynamically reorganized or filtered within categories based on user-specific task-oriented information (e.g., user profile). For example, a first-time user visiting the city of Los Angeles may be provided with apps reorganized internally within the city-level category for L.A. such that the most relevant apps are determined to be directed toward tourism (e.g., sightseeing excursions). In another example, a frequent visitor of the city of L.A. may be provided with apps reorganized internally within the city-level category for L.A. such that the most relevant apps are determined to be directed toward a resident (e.g., local news articles).

From the perspective of the user, discovery of applications that are relevant, or "valid," for a particular location occurs in a non-transparent manner without distracting the user (e.g., in a back-end process at a remote server), while the display of apps selected from the discovered, relevant apps is conducted in real-time (e.g., in a front-end process at a mobile device). As discussed above, the ranking may be performed initially offline (e.g., using metrics of popularity) and/or online (e.g., using preferences personal to the user). In operation, upon receiving an indication of a location signal (e.g., current location of a user or searched location by the user) or a task signal (e.g., ongoing endeavor of the user), the back-end process takes the following steps: retrieves apps that are valid for the location signal via the mapping, filters the valid apps to those that are relevant to the task signal, and displays a number of the highest ranked apps of the relevant apps, where the number is dependent on an amount of display-area real estate available. In an exemplary embodiment, the available display-area real estate is calculated from a mobile homepage, a search engine result page, an unlocked home screen, or a locked home screen.

BRIEF DESCRIPTION OF THE DRAWINGS

Embodiments of the invention are described in detail below with reference to the attached drawing figures, wherein:

FIG. 6 is a schematic diagram depicting a second illustrative UI display that includes a representation an application surfaced proximate to a relevant search result, in accordance with embodiments of the invention;

FIGS. 13 and 14 are a schematic diagrams depicting a sixth and a seventh illustrative UI display that include representations of applications surfaced proximate to a relevant location-based entry on a search-result page, in accordance with embodiments of the invention;

DETAILED DESCRIPTION

Figure 1:
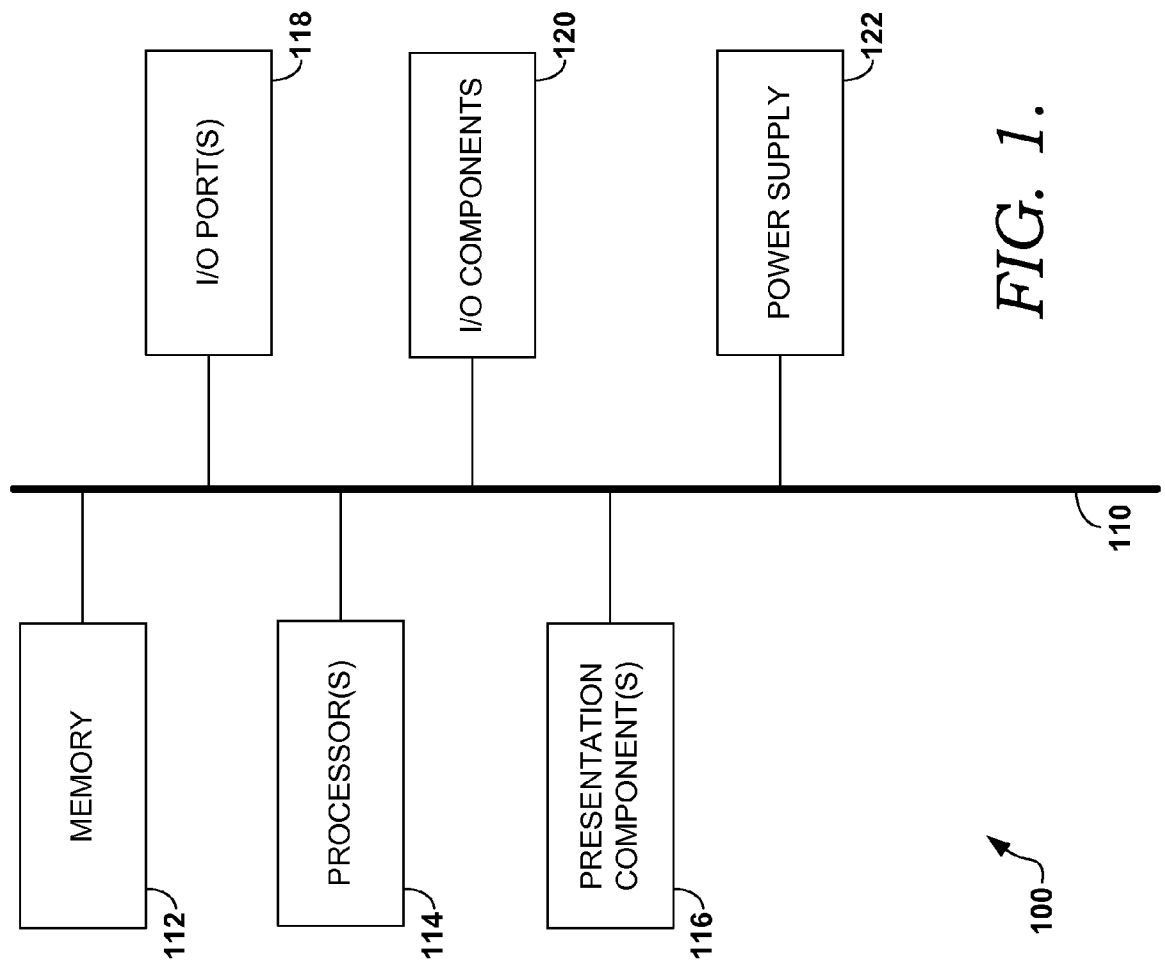
FIG. 1 is a block diagram of an exemplary computing device suitable for implementing embodiments of the invention.

The subject matter of embodiments of the invention disclosed herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Generally embodiments of the present invention pertain to employing a search engine to produce search results that are responsive to a query. However, when the query is not explicitly asking for applications, or apps, then conventional search engines typically return websites they deem relevant to the query. For example, if a query includes the keywords "Italian restaurants Bellevue reservation," conventional search engines will likely return a number of websites for local business. Yet, for this query, it is apparent the user's true intent is to find information about Italian restaurants in Bellevue, Wash., and possibly make a reservation. While the websites produced by the conventional search engine may be generally relevant to the query, there could exist a number of apps that might also serve the user's intent more robustly. That is, providing apps within the search results in conjunction with the relevant websites would likely help the user complete their tasks faster. In this case, those apps that would help the user more expediently accomplish their task could be Yelp®, Urbanspoon®, OpenTable®, or any other app that is capable of accepting, making, and confirming reservations. Unfortunately, the conventional search engines fail to surface applications beyond those cases in which users are specifically and explicitly asking for them.

To address this deficiency of conventional search engines, exemplary embodiments of the present invention include configuring search engines to return and surface apps that are relevant to queries that do not explicitly target apps. As a result, providing these apps as part of the search results will potentially help users to complete their tasks faster and with better accuracy.

In one instance, providing apps may be accomplished by leveraging the parity or inherent association between apps and websites. By way of example, a restaurant-focused app may have a significant presence within the content of a website dealing with cooking (e.g., article reviewing the most popular apps for finding a restaurant). As will be described more fully below, search engines of the present invention may be configured to return and surface this restaurant-focused app even when the user's query did not include mention of "apps" or even names of apps. In this way, these search engines may be configured to return relevant apps that implicitly correlate to a user's intent behind a query, without the query explicitly targeting an application.

As can be gleaned from the disclosure above, various embodiments of the present invention involve employing a mapping between apps and search results as well as implementing the mapping to generate search results with apps integrated therein. Often, the search results are generated and surfaced on a user-interface (UI) display through the employment of task-based engines (e.g., decision engines, task engines, individual applications or operations, applet systems, operating systems, and task-based mobile systems), or general systems that allow a user to accomplish tasks by matching apps to user intent. For simplicity of discussion, these engines and/or systems will be hereinafter referred to as "search engines."

These search engines can publish search results that include a representation of app(s), where the app(s) are selected based on the mapping between apps and websites within the search results, for example. For instance, the query "Italian restaurants Bellevue reservation" may prompt the search engine of the present invention to return links to apps for Yelp®, Urbanspoon®, or OpenTable® in-line with the other search results. Upon a user selecting a representation of a particular app, the search engine may then launch the underlying app, if previously installed, and pass the context of the query to the app. Accordingly, the app may be launched to an entry point that takes the user directly to an applet within the app that pertains to the user's task.

Accordingly, one embodiment of the present invention may involve computer-readable media that support the operations of computer-executable instructions thereon. When executed, the computer-executable instructions may perform a method for surfacing one or more applications as a function of search results. In one instance, the method comprises the steps of receiving a query submitted at a search engine and employing a keyword (e.g., term or phrase) of the query to generate an initial set of search results. The method may further comprise identifying characteristic(s) of a subject result of the initial set of search results and determining application(s) that are relevant to the characteristic(s).

This determination of application(s) that are relevant to the subject result's characteristics may include one or more of the following steps: accessing an application manifest that includes a mapping between applications and predefined characteristics; comparing the characteristics of the subject result against the predefined characteristics of the application manifest to determine a match; and, when a match exists between the characteristics of the subject result and the predefined characteristics of the application manifest, identifying the application(s) associated with the matched predefined characteristics as being relevant to the subject result. These identified application(s) may be presented on a user-interface (UI) display in response to the query. In a particular instance, presenting may involve integrating the application(s) within the initial set of search results and surfacing the integrated application(s) concurrently with the initial set of search results on the UI display.

In another embodiment of the present invention, a computer system is established and configured for selecting at least one application using one or more characteristics of search results. Generally, the computer system includes a processing unit coupled to a computer-storage medium, where the computer-storage medium stores a plurality of computer software components that are executable by the processing unit. As described more fully below, the computer software components may include an application manifest, a search engine, a characteristic-matching component, and a selection component. The application manifest serves to persist and provide access to a listing of applications mined from an application marketplace. Typically, the applications within the listing are mapped to predefined characteristics. The search engine is configured for generating an initial set of search results as a function of a query submitted by a user. The characteristic-matching component acts to identify a high-ranking one of the initial search results as a subject result and, in embodiments, to compare characteristics inherent to the subject result against the predefined characteristics of the application manifest. The selection component is provided for selecting application(s) listed in the application manifest that are associated with the predefined characteristics matching the inherent characteristics of the subject result. At some point, the selection component may trigger storing the application(s) as candidates for concurrent display with the initial set of search results.

In yet another embodiment of the present invention, a search engine running on a processor may be provided for performing a method of surfacing at least one application with respect to content of a web page (e.g., online document). The method may initially involve rendering a web page with content (e.g., text) on a UI display of a computing device. In instances, the method may include the steps of receiving a user-initiated selection of a term or phrase within the content and determining, in response to the selection, the application(s) that are relevant to the term or phase. These relevant application(s) may then be presented in a display area that overlays at least a portion of the web page.

Other embodiments of the technology introduced by the present invention involve the ability to discover and surface apps in a location-based based context. Accordingly, one embodiment of the present invention may involve computer-readable media that support the operations of computer-executable instructions thereon. When executed, the computer-executable instructions may perform a method for surfacing one or more applications as a function of location-based information. In one instance, the method comprises the steps of automatically detecting a location signal at a mobile device being operated by a user and using the location signal to identify a set of valid applications. In embodiments, the location signal represents the location-based information that is entered to or received from the mobile device.

In a particular instance, the process of identifying the set of valid applications using the location signal comprises the following steps: comparing the location signal against an application manifest that maintains a mapping between apps and their respective geographic boundaries; and, based on the comparison, designating those apps that are mapped to geographic boundaries that meet the location signal as the set of valid applications. Upon identifying the set of valid applications, the method may further involve sending a selection of apps included within the set of valid applications to the mobile device for display to the user within a operational context.

In another embodiment, a computer system is provided for identifying a set of valid applications upon receiving location-based and task-based information from a mobile device. Initially, the computer system includes, a data store, a mobile device, and a processing device. The data store is configured for hosting an application manifest that exposes a listing of applications mined from an application marketplace. Generally, the applications within the listing are mapped to respective geographic boundaries and categories.

The mobile device is typically configured for providing a location signal and a task signal. As mentioned above, the location signal represents location-based information entered by a user of the mobile device or derived from a geographic position of the mobile device. On the other hand, the task signal represents task-based information that exposes user-initiated operations performed on the mobile device. The processing device is configured for receiving the location signal and the task signal from the mobile device. In one embodiment, the processing device is configured for comparing the location signal against the application manifest to identify one or more applications mapped to geographic boundaries that are valid with respect to the location signal. In another embodiment, the processing device is configured for comparing the task signal against the application manifest to identify one or more applications mapped to categories that are relevant with respect to the task signal. Further, the processing device may carry out a process for selecting applications from an overlapping set of the one or more valid applications and the one or more relevant applications.

In yet another embodiment, a computerized method carried out by a processing unit is introduced by the present invention. The computerized method generally involves selecting at least one application to present on a display area of a computing device. In one instance, the method includes identifying one or more geographic boundaries for the application(s). Particularly, the process of identifying comprises the following steps: abstracting a local intent from metadata accompanying the application(s) upon submission to a catalogue within an application marketplace; and assigning the one or more geographic boundaries as a function of the local intent.

The method may additionally involve mapping the geographic boundaries to the application(s), and storing the mapping within an application manifest. At some later time, a location signal may be receive from the computing device (e.g., mobile handset), where the location signal represents location-based information that is provided by the computing device. Typically, the location signal is compared against the application manifest and the application(s) are selected for display on the computing device as a function of the comparison.

Having described an overview of embodiments of the present invention, an exemplary operating environment in which embodiments of the present invention may be implemented is described below in order to provide a general context for various aspects of the present invention.

The following discussion describes various embodiments of the present invention. Note that several of the exemplary embodiments described below are based on current applications to make the discussion more concrete. However, aspects of the present invention should not be construed as being limited a particular application or platform that offers the particular application. That is, embodiments of the present invention may be designed to be applied to differing platforms (e.g., including PC, iPhone®, and Microsoft Windows®) and other various implementations of an application marketplace.

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and nonremovable media. By way of example, and not limitation, computer-readable media may comprise computer storage media and communication media. Computer storage media include both volatile and nonvolatile, removable and nonremovable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computing device 100. Communication media typically embody computer-readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
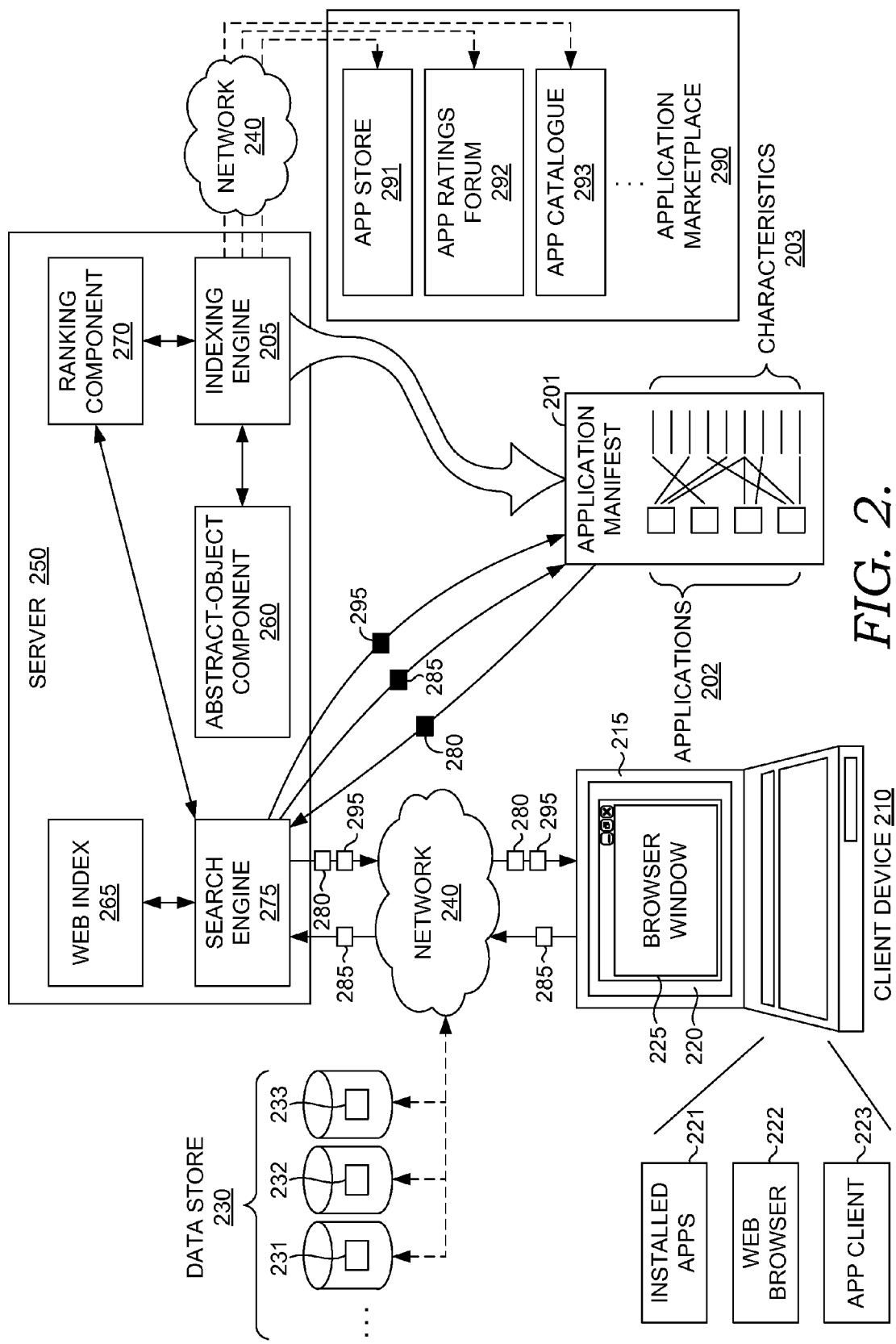
FIG. 2 is a block diagram of an exemplary system architecture of a distributed computing environment configured for use in implementing embodiments of the present invention.

Technology, introduced by embodiments of the present invention, for automatically discovering apps relevant to a query and surfacing on a UI display representation(s) of the relevant apps as part of the search results will now be discussed with reference to FIG. 2. In particular, FIG. 2 depicts a block diagram that illustrates an exemplary system architecture 200 of a distributed computing environment, suitable for use in implementing embodiments of the present invention. Generally, implementing embodiments of the present invention relate to discovering apps in response to an implicit query and presenting those apps as search results to a user (e.g., rendering the apps in-line with websites on a search-result page of a UI display). It should be understood and appreciated that the exemplary system architecture 200 shown in FIG. 2 is merely an example of one suitable computing environment and is not intended to suggest any limitation as to the scope of use or functionality of the present invention. Neither should the exemplary system architecture 200 be interpreted as having any dependency or requirement related to any single component or combination of components illustrated therein.

Initially, the exemplary system architecture 200 includes an application manifest 201, a client device 210, data stores 230, a server 250, an application marketplace 290 and a network 240 that interconnects each of these items. Each of the client device 210, the data stores 230, the server 250, and the application marketplace 290 shown in FIG. 2, may take the form of various types of computing devices, such as, for example, the computing device 100 described above with reference to FIG. 1. By way of example only and not limitation, the client device 210 and/or the server 250 may be a personal computer, desktop computer, laptop computer, consumer electronic device, handheld device (e.g., personal digital assistant), various servers, processing equipment, and the like. It should be noted, however, that the invention is not limited to implementation on such computing devices but may be implemented on any of a variety of different types of computing devices within the scope of embodiments of the present invention.

Typically, each of the devices 210 and 250 includes, or is linked to, some form of computing unit (e.g., central processing unit, microprocessor, etc.) to support operations of the component(s) running thereon (e.g., search engine 275, indexing engine 205, and the like). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the devices 210 and 250 to enable each device to perform communication-related processes and other operations (e.g., accessing the data store 230 or discovering apps 202 within the application manifest 201). In another instance, the computing unit may encompass a processor (not shown) coupled to the computer-readable medium accommodated by each of the devices 210 and 250.

Generally, the computer-readable medium includes physical memory that stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

Also, beyond processing instructions, the processor may transfer information to and from other resources that are integral to, or disposed on, the devices 210 and 250. Generally, resources refer to software components or hardware mechanisms that enable the devices 210 and 250 to perform a particular function. By way of example only, the resources accommodated by the server 250 may include one or more of the following: an indexing engine 205; an abstract-object component 260; a web index 265; a ranking component 270; and the search engine 275.

The client device 210 may include an input device (not shown) and a presentation device 215. Generally, the input device is provided to receive input(s) affecting, among other things, a presentation of the search results in a browser window 225 surfaced at a UI display area 220. Illustrative devices include a mouse, joystick, key pad, microphone, I/O components 120 of FIG. 1, or any other component capable of receiving a user input and communicating an indication of that input to the client device 210. By way of example only, the input device facilitates entry of a query and controls the location of a selection tool (e.g., mouse pointer) hovering over the search results that are responsive to the query.

In embodiments, the presentation device 215 is configured to render and/or present the UI display 220 thereon. The presentation device 215, which is operably coupled to an output of the client device 210, may be configured as any presentation component that is capable of presenting information to a user, such as a digital monitor, electronic display panel, touch-screen, analog set top box, plasma screen, audio speakers, Braille pad, and the like. In one exemplary embodiment, the presentation device 215 is configured to present rich content, such as the browser window 225 that includes a display area populated with search results (e.g., digital images). In another exemplary embodiment, the presentation device 215 is capable of rendering other forms of media (e.g., audio signals). In yet another exemplary embodiment, the presentation device 215 may present a portion of the search results (e.g., descriptions of and links to websites) in proximity with representations of apps, as more fully discussed below.

The data store(s) 230 are generally configured to store information associated with a user-submitted query and/or data generated from previous query results and user interaction therewith, discussed below. In various embodiments, such information may include, without limitation, recorded search behavior 231 (e.g., query logs, related searches list, etc.) of society in general, a log 232 of a particular user's tracked interactions with the search engine 275, and other information 233 that pertains to embodiments of the present invention. In addition, the data store(s) 230 may be configured to be searchable for suitable access of the stored information. For instance, the data store(s) 230 may be searchable for one or more user-initiated queries previously entered or currently pending. It will be understood and appreciated by those of ordinary skill in the art that the information stored in the data store(s) 230 may be configurable and may include any information relevant to the execution of the search engine 275. The content and volume of such information are not intended to limit the scope of embodiments of the present invention in any way. Further, though illustrated as single, independent components, the data store(s) 230 may, in fact, be a plurality of databases, for instance, a database cluster, portions of which may reside on the client device 210, the server 250, another external computing device (not shown), and/or any combination thereof.

This exemplary system architecture 200 is but one example of a suitable environment that may be implemented to carry out aspects of the present invention and is not intended to suggest any limitation as to the scope of use or functionality of the invention. Neither should the illustrated exemplary system architecture 200 be interpreted as having any dependency or requirement relating to any one or combination of the client device 210, the data stores 230, the server 250, the application marketplace 290, and components 205, 260, 265, 270, and 275, as illustrated. In some embodiments, one or more of the components 205, 260, 265, 270, and 275 may be implemented as stand-alone devices. In other embodiments, one or more of the components 205, 260, 265, 270, and 275 may be integrated directly into the server 250, or on distributed nodes that interconnect to form the server 250. It will be understood by those of ordinary skill in the art that the components 205, 260, 265, 270, and 275 (illustrated in FIG. 2) are exemplary in nature and in number and should not be construed as limiting.

Accordingly, any number of components may be employed to achieve the desired functionality within the scope of embodiments of the present invention. Although the various components of FIG. 2 are shown with lines for the sake of clarity, in reality, delineating various components is not so clear, and, metaphorically, the lines would more accurately be grey or fuzzy. Further, although some components of FIG. 2 are depicted as single blocks, the depictions are exemplary in nature and in number and are not to be construed as limiting (e.g., although only one presentation device 215 is shown, many more may be communicatively coupled to the client device 210).

Further, the devices of the exemplary system architecture may be interconnected by any method known in the relevant field. For instance, the server 250 and the client device 210 may be operably coupled via a distributed computing environment that includes multiple computing devices coupled with one another via one or more networks 240. In embodiments, the network 240 may include, without limitation, one or more local area networks (LANs) and/or wide area networks (WANs). Such networking environments are commonplace in offices, enterprise-wide computer networks, intranets, and the Internet. Accordingly, the network is not further described herein.

In operation, the components 205, 260, 265, 270, and 275 are designed to perform a process that includes, at least, the steps of receiving a query 285 from a web browser 222 running on the client device 210, generating search results 295 that are responsive to the query 285, inspecting the application manifest 201 with characteristics 203 of the search results 295 to identify apps 202 mapped thereto, and sending relevant apps 280 to the web browser 222 for presentation at the browser window 225 as part of the search results 295. Initially, as illustrated in FIG. 2, the application manifest 201 typically includes a mapping between apps 202 and characteristics 203 of websites. These characteristics 203 may involve any known attributes of websites that may be identified for use in digitally linking those websites to the apps 202, as more fully discussed below.

In embodiments, the indexing engine 205 is responsible for constructing and maintaining the application manifest 201. By way of example, constructing the application manifest 201 may involve crawling the application marketplace 290 for available apps 202 and associating the apps 202 with websites using characteristics 203 of the websites. Crawling the application marketplace 290 may comprise mining applications from such sources as an app store 291, an app ratings forum 292, and/or an app catalog 293. It should be understood and appreciated that other sources for accessing applications may be used, and the illustrated sources 291-293 do not represent an exhaustive listing. Further, the application marketplace 290 may vary based on an applications platform (e.g., Microsoft® Apps, Android®, and the like) running on the client device 210.

Constructing the mapping between the apps 202 and the characteristics 203 may involve defining or distilling properties of particular websites. For instance, a web address, such as a uniform source identifier (URI) and/or uniform source locator (URL), may be used as the characteristics 203 that link applications to websites, when the applications and the websites exhibit parity therebetween. As used herein, the term "parity" broadly relates to an association between one or more applications and one or more websites based on a common task performed, corresponding online service provider, and/or similar underlying program or functionality. These applications and websites that exhibit parity are considered to be directly relevant such that, in embodiments, the mapping between these applications and websites may be derived from content of the website's URL. This content of the URL (e.g., characteristics 203 of the website) may then be linked to an application (e.g., apps 202 of the application manifest 201) having a name or descriptor that resembles some or all of the URL's content.

Figure 8:
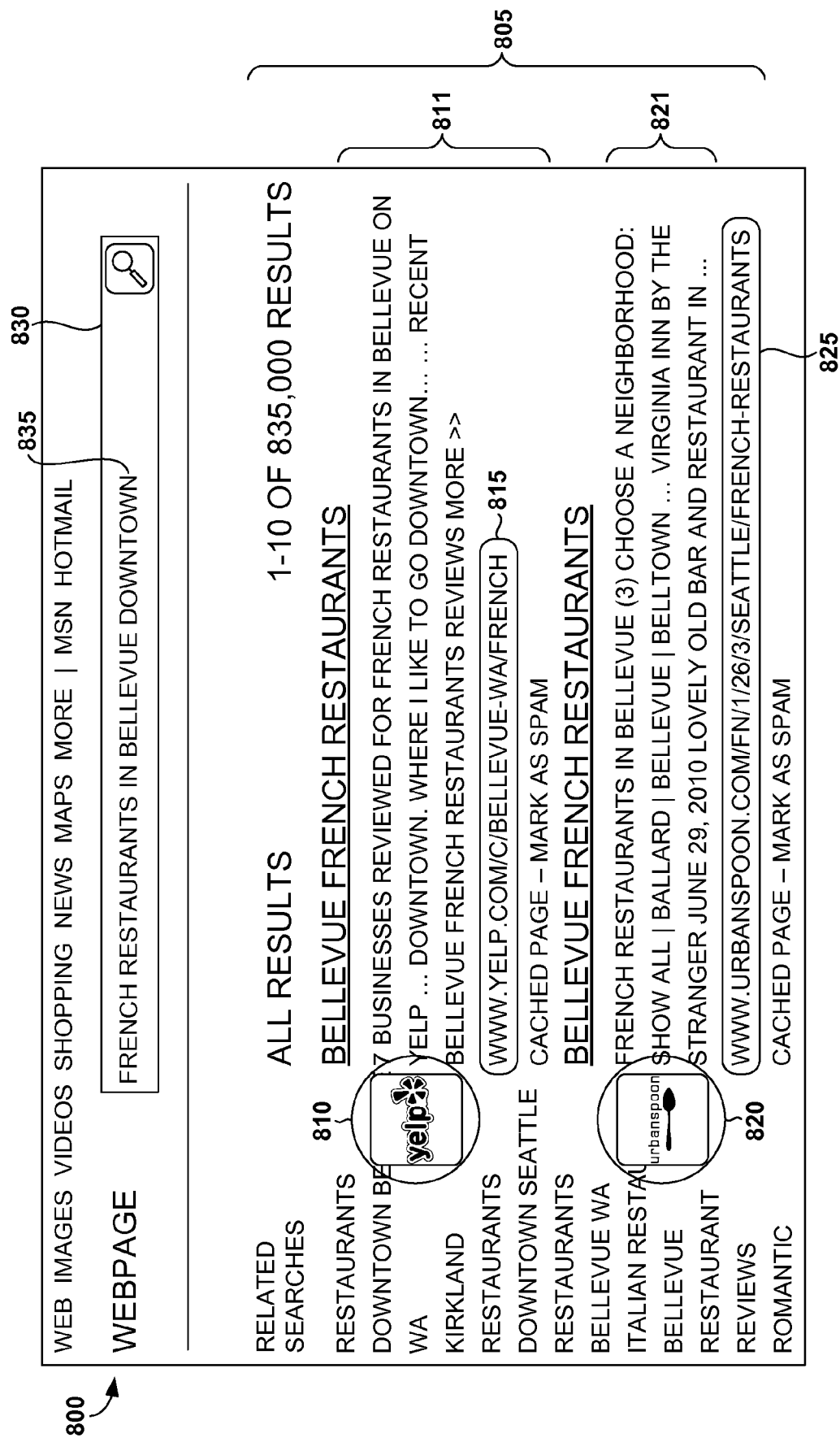
FIG. 8 is a schematic diagram depicting a fourth illustrative UI display that includes representations of applications that exhibit parity with respective search results, in accordance with embodiments of the invention.

In one example, as illustrated in an exemplary UI display 800 of FIG. 8, from the URL or web address "www.urbanspoon.com" 825, the indexing engine can infer that the Urbanspoon® application 820 will exhibit parity with a website 821 having the web address "www.urbanspoon.com." Consequently, the Urbanspoon® application 820 will likely be directly relevant to a query 835 (e.g., "Italian restaurants Bellevue reservation") that generated search results that include the website 821 having the web address 825 "www.urbanspoon.com." As such, upon determining that the website 821 having the web address 825 "www.urbanspoon.com" is listed in the search-results page 805, the Urbanspoon® application 820 is selected from the application manifest 201 (i.e., the search engine 275 comparing the web address 825 against the predefined characteristics 203 to find one or more matching apps 202) as a candidate app to be returned to the user in-line within the search-results page 805. Moreover, if a website (e.g., website 811 that includes the web address 815) that exhibits parity with the candidate app (e.g., application 810 Yelp®) is listed towards the top of a search-results page 805 presented at the UI display 800, then there is a strong indication that the candidate app is useful to complete the user's tasks. The ranking component 270 may consider this placement of the website, with respect to other websites within the search results, when determining whether to select the candidate application for incorporation within the search results.

In another embodiment, an application may be determined to be relevant to a query when the application is expressly related to a website discovered in response to the query. This express relationship between an application and a web address occurs when a website that includes metadata (e.g., name, description, or other content) pointing to the application. Further, this express relationship may be stored and updated via mappings in the application manifest 201. For example, an application entitled Doodle Jump® may be expressly related to an app-review website that has the web address http://www.148apps.com/reviews/doodle-jump because the application's name is mentioned within the content of the app-review website's URL. As such, a query that generates search results having this app-review website listed therein will likely invoke the discovery and display of the relevant Doodle Jump® application within the search results. In embodiments, as discussed more fully below, a portion of an article posted at the app-review website discussing the Doodle Jump® application may be surfaced in the search results 295 to portray the search engine's 275 rationale for selecting the Doodle Jump® application and, further, to assist the user with making an informed decision as to whether to download or launch Doodle Jump® application.

It should be understood and appreciated that any content within a website may be used as the characteristics 203 for mapping against apps 202, and that embodiments of the present invention contemplate a variety of alternative sources within, or associated with, a website for extracting content to be transformed into website characteristics 203. For instance, an application may be virtually linked with a first website whose content includes just a link to a second website that posts the actual discussion (e.g., review article of apps) mentioning the application.

In a variant embodiment of using web addresses to discover applications, the URL's of the search results may be shortened to encompass a broader range of applications. Initially, the characteristics 203 within the application manifest may represent truncated URL's that typically point to a website without referencing a particular web page or sub-location therein. Consequently, upon receiving the query, the websites identified at the web index 265 as being responsive to the query 285 are normalized. Typically, normalizing involves modifying the URL of each website from a specific page locator to a generic site locator. The search engine 275 may then compare the generic site locator, or normalized URL, against the truncated URL's of the application manifest to determine a match. Upon comparison, the apps 202 mapped to the matching truncated URL's are identified and designated as candidates for presentation alongside the search results 295.

Returning to the application manifest 201, applications that are indirectly relevant to a given query may be mapped based on matching capabilities of the application with an overarching concept or goal of the website. For example, if the search results include a website for a restaurant (e.g., http://seastarrestaurant.com), this website can be mapped against the Urbanspoon® application based on the indexing engine's 205 understanding that the content of the restaurant website references or pairs with capabilities of the Urbanspoon® application. In a particular instance, the restaurant website may include a review of the Urbanspoon® application, which would generate the user's interest in testing the Urbanspoon® application. Or, in another instance, the restaurant website might suggest an interesting diner, while the Urbanspoon® application would allow the user to make reservations at that diner.

In another example of employing the application manifest 201 to identify applications that are indirectly relevant to a query, the user's query or queries within a search event might be related to an entity. The abstract-object component 260 may have access to predefined entities and may manage the mapping of these entities to applications. In operation, entities are used to find relevant applications that share a similar concept.

As used herein, the term "entity" generally refers to an abstract object that cannot be adequately managed through keywords. That is, abstract objects consider the context of a user's search event, which exposes the user's true intent, as opposed to employing just keyword-matching techniques, which do not always target the user's intent. Accordingly, entities may be logical objects that may be represented by a particular online description. These logical objects may be a person, place, thing, or any combination thereof. For instance, some examples of logical objects are the following: a particular movie; a restaurant on Castro Street in the city of Mountain View, Calif.; the CEO of Microsoft®) the Alaska Airlines' flight #AS331 from San Jose to Seattle; or a digital camera.

Typically, predefined entities may be indexed within the application manifest 201 as characteristics 203 that may be interrogated with one or more entities related to an ongoing search event. In practice, a user conducting the search event (e.g., comprising at least one user-initiated query and/or at least selection of a search result) may wish to target a particular movie, for example, rather than a book or other product with a similar name. The search engine 275 may derive the entity corresponding to the targeted movie from the search event and convey the derived entity to the abstract-object component 260 that, in turn, compares the derived entity against predefined entities within the application manifest 201. Upon finding a match, the abstract-object component 260 may then identify the apps 202 mapped to the matching predefined entity and designate the identified apps 202 as candidates for presentation within the search results 295. In this way, the search engine identifies apps 202 that are relevant to the user's true intent, and avoids placing in the search results those applications that share keywords with the query but fail to share a common concept.

In an example of using entities, an example query 285 may include the keywords "Seattle to Boston." Based on the subject matter of the query 285 and/or other queries within an ongoing search event, the search engine 275 may determine that the user's intent is to book a flight. Accordingly, the search engine 275 may select a travel-based entity to be associated with the ongoing search event and, via interaction with the web index 265, identify websites that are related to air travel. Further, the search engine 275 may communicate the travel-based entity and/or pass the air-travel-related websites to the abstract-object component 260. In response, the abstract-object component 260 may examine the application manifest 201 with the travel-based entity and/or air-travel-related websites to find one or more predefined entities and/or websites, respectively, that match. The apps 202 mapped to the matching predefined entities and/or websites are designated as candidates for display and are then ranked by the ranking component 270. The highest-ranked candidates (e.g., based on number of purchases, popularity, or the app ratings forum 292) are then returned as apps 280 to the search engine 275 for incorporation within the search results 295. Thus, although the keywords "Seattle" and "Boston" are likely nowhere within the metadata of the apps 280, the apps 280 are determined to be relevant, via the use of entities, to the query and satisfy the user's intent of the search event even more so than applications that do include the keywords within their metadata.

In another embodiment, the characteristics 203 of the application manifest 201 relate to the query 285, as opposed to search results 295 or a predefined entity managed by the abstract-object component 260. In this embodiment, metadata within the apps 202 may be predetermined to be implicitly related to one or more keywords of a query. Accordingly, the mapping in the application manifest 201 may capture and expose this implicit relationship between the apps 202 and the keywords. In operation, when the query 285 is received by the search engine 275, the query 285 is parsed to extract the keywords therefrom and compared against the keywords within the application manifest 201 to discover apps 202 mapped thereto.

In yet another embodiment, the characteristics 203 of the application manifest 201 may involve catalogued keywords that pertain to a common concept, task, or intent. In one example, the catalogues may be developed by a third party, such as an app developer or the app store 291. In another example, the catalogues may be derived directly from search terms associated with the online app catalogue 293 accessible within the application marketplace 290. In operation, upon receiving the query 285, the term(s) or phase(s) of the query 285 may be implicitly matched against the catalogues to determine the apps 202 being referenced.

In still another embodiment, the characteristics 203 of the application manifest 201 may pertain to tasks that the user is currently performing while conducting a search event. Typically, a task may be distilled from or generally represent a sequence of user-actions (e.g., link selections, dwell times, previous queries, and/or other interactions with the web browser 222) carried out during the search event. In particular, the user-actions taken by the user may be logged by the search engine 275 and stored at the data store 230 of FIG. 2. The abstract-object component 260 may inspect the logged user-actions at the data store 230 and, upon analysis, target an appropriate task that encompasses the goal of the user-actions. This task may be compared against the characteristics 203 of the application manifest 201 to determine those apps 202 that are mapped to the task.

Although various types of characteristics 203 employed for mapping the query 285 and/or websites of the search results 295 to apps 202 have been described, it should be understood and appreciated that other types of suitable characteristics 203 that implicitly or conceptually describe an application may be used, and that embodiments of the present invention are not limited to those characteristics 203 discussed above. For instance, beyond using entities derived from the search event and predefined for the apps in the application manifest 201, the search engine 275 may distill other information from the query 285, the search results 295, and/or the ongoing search event, such as overall tasks the user is attempting perform (e.g., plan a night out in Seattle) or actions the user is attempting to carry out (e.g., search for a song or artist).

With reference to FIGS. 3 and 4A-4C, the functionality of an exemplary system architecture 300 will now be discussed. Initially, the operational flow diagram of FIGS. 4A-4C introduces a technique for discovering apps related to search results and/or relevant to a query without the query explicitly targeting the apps, as implemented by the exemplary system architecture 300 shown in FIG. 3. It should be noted that like reference numerals identify like components in the various figures, such as the web browser 222 of FIGS. 2, 3, and 4A-4C.

As illustrated, the search engine 275 is configured to discover apps 202 for queries 285 with an implicit intent to produce applications within the search results 295. One way to achieve discovery of apps 202 is for the search engine 275 to leverage the web sites that are responsive to the query 285 to decide what applications are relevant and should be returned, as discussed above. Accordingly, other indicators (e.g., characteristics 203 of web sites within the application manifest 201) may be used to discover apps 202 without the explicit wording included in the query 285 itself. In order to implement this process, the search engine 275 may rely upon various components 276, 277, and 278 that are responsible for managing sub-processes having defined operations, as discussed with respect to FIGS. 4A-4C below.

The process for discovering relevant apps 202 typically commences upon a user-initiated query 285 being received at the web browser 222. For example, the query 285 may be received upon entry into a search box of a toolbar or browser window 225 of a UI display 220 (see FIG. 2). Upon submission of the query 285 to the web browser 222 or any other application designed to access the Internet, the query 285 is conveyed to the search engine 275. As depicted at operation 405, terms or phrases 401 may be extracted from query 285. These terms or phrases 401 may be communicated in a request to retrieve search results from a web index 265 (see FIG. 2). In reply to the request, the web index 265 may return to the search engine 275 search results 295 that are responsive to the query 285. As depicted at operation 410, the search engine 275 may identify characteristics 310 inherent to the initial set of search results 295.

Once these characteristics 310 are identified from the search results 295 (e.g., URL's are generic site locators of websites), apps 280 relevant to the inherent characteristics 310 of the search results 295 are determined by employing the characteristics 310 to inspect the application manifest 201. A characteristic-matching component 276 (see FIG. 3) may be provisioned within the search engine 275 to inspect the application manifest 201 by comparing the characteristics 310 against the predefined characteristics 203 to find a matching app 280 as depicted at operation 420. As mentioned above, the indexing engine 205 of FIG. 2 is provided to mine apps 202, and to construct and maintain the mapping between the mined apps 202 and the predefined characteristics 203. In instances, the predefined characteristics 203 may comprise abstract objects that describe a respective intent of a user when implementing a search event.

In an exemplary embodiment, the characteristic-matching component 276 may identify a high-ranking one of the initial search results 295 as a subject result, and interrogate the subject result against the predefined characteristics 203 of the application manifest 201. This embodiment effectively limits the discovered apps 280 to those that are deemed highly relevant to the query 285. In other embodiments, as discussed above, qualities of the query 285 may be abstracted and directly used to discover relevant apps without the consideration of the search results 295. In still other embodiments, relevant apps arrived upon from separate streams of logic (e.g., the search results 295 and the implicit qualities of the query 285) may be joined via a selection component 277 to surface those applications 330 that are determined to be most useful to the user's search intent.

As depicted at operation 425, top-rated applications 330 may be selected from the relevant apps 280 by implementing the selection component 277. In one instance, the selection component 277 is configured for selecting relevant app(s) 280 returned from the characteristic-matching component 276 and for storing the app(s) 280 as a candidates for concurrent display with the initial set of search results 295. In another instance, as depicted at operation 425, the selection component 277 may be responsible for narrowing the relevant apps 280 to top-rated applications 330 by interacting with the ranking component 270. The ranking component 270, as more fully discussed above with reference to FIG. 2, serves to organize the relevant apps 280 based on one or more rating schemes and to limit the applications surfaced within the search results 295 based on at least one predefined threshold.

Figure 3:
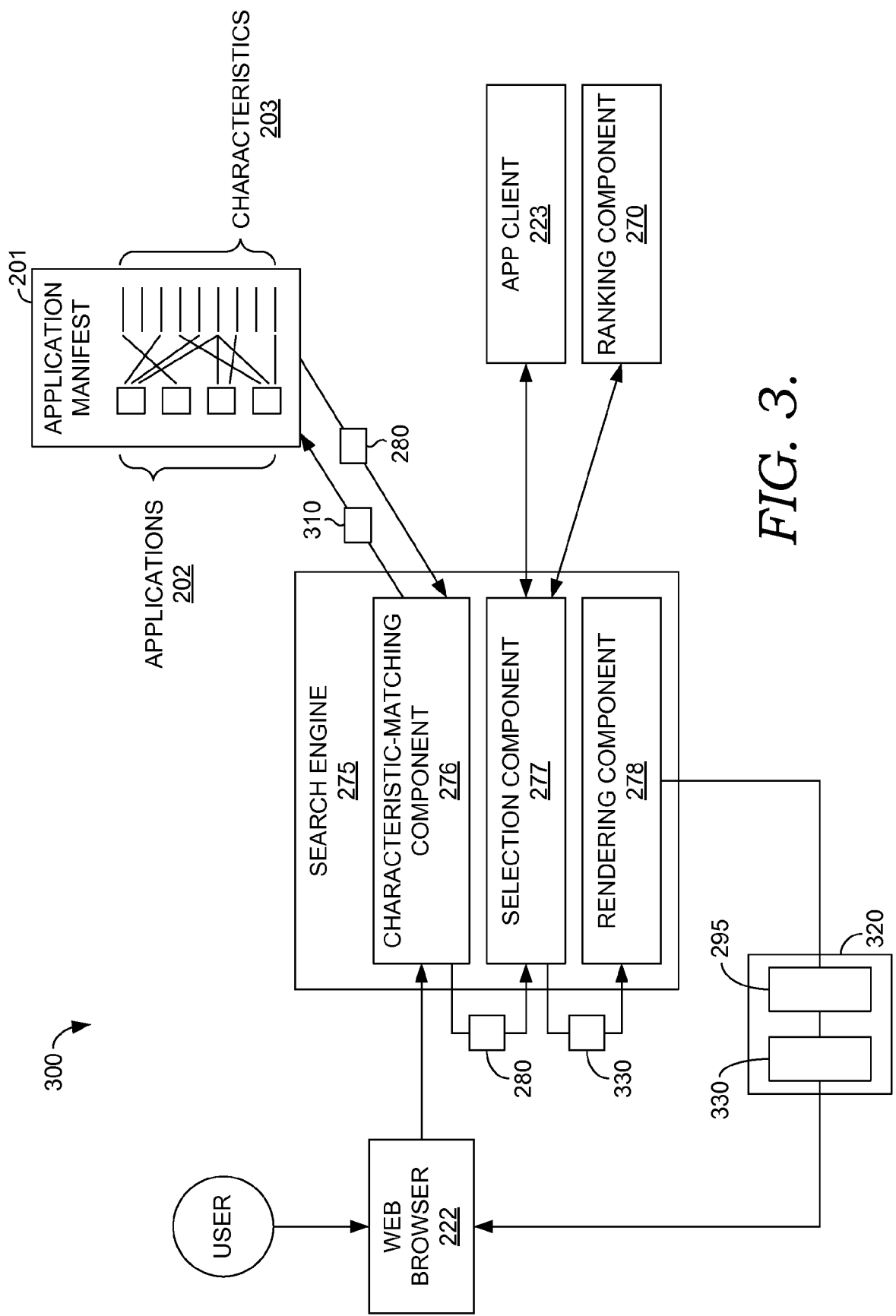
FIG. 3 is a block diagram of an inter-component communication scheme within the exemplary system architecture of FIG. 2, in accordance with embodiments of the present invention.

In yet another instance, the selection component 277 may interface with the app client 223 running on the client device 210, as illustrated at FIG. 3. The app client 223 may have access to the apps 221 installed at the client device (see FIG. 2). Accordingly, the app client 223 may help the selection component 277 to select the top-rated applications 330 from the relevant apps 280 based on the identity of the installed apps to 221 residing within memory of the client device 210.

In still another instance, the selection component 277 may be designed to compile or provided access to a log of user interactions accrued while the user is implementing the search event. Upon reviewing data persisted within the user-interaction log, the selection component 277 may compare information from the log against the predefined characteristics 203 of the application manifest 201 to discover relevant apps 280. Or, the selection component 277 may apply the log information to filter low-rated applications from the relevant apps 280.

In yet another instance, the selection component 277 may be configured to check ranking scale(s) (e.g., popularity-based rankings and/or relevance-based rankings) of apps to distill top-rated applications 330 from the relevant apps 280. These ranking scale(s) may be derived from any number of sources (e.g., the app ratings forum 292 of FIG. 2, data logged from general searching and/or downloading, app-centric blogs, articles, opinion posts, or other reputable sources) and may be employed to effectively dismiss from consideration those apps 280 initially determined irrelevant. For example, if a video game is returned as a relevant app 280, the selection component 277 may, in accordance with ranking scale(s), determine the main version of the video game as being top-rated while listing the remaining versions (e.g., holiday version, special release, and guides and tips) as lower-rated. As a result, a transmission 320 with the top-rated applications 330 may be conveyed for rendering at the web browser 222, while the lower-rated applications may be cached in case the user wants to surface additional applications upon inspecting the search results 295.

Figure 5:
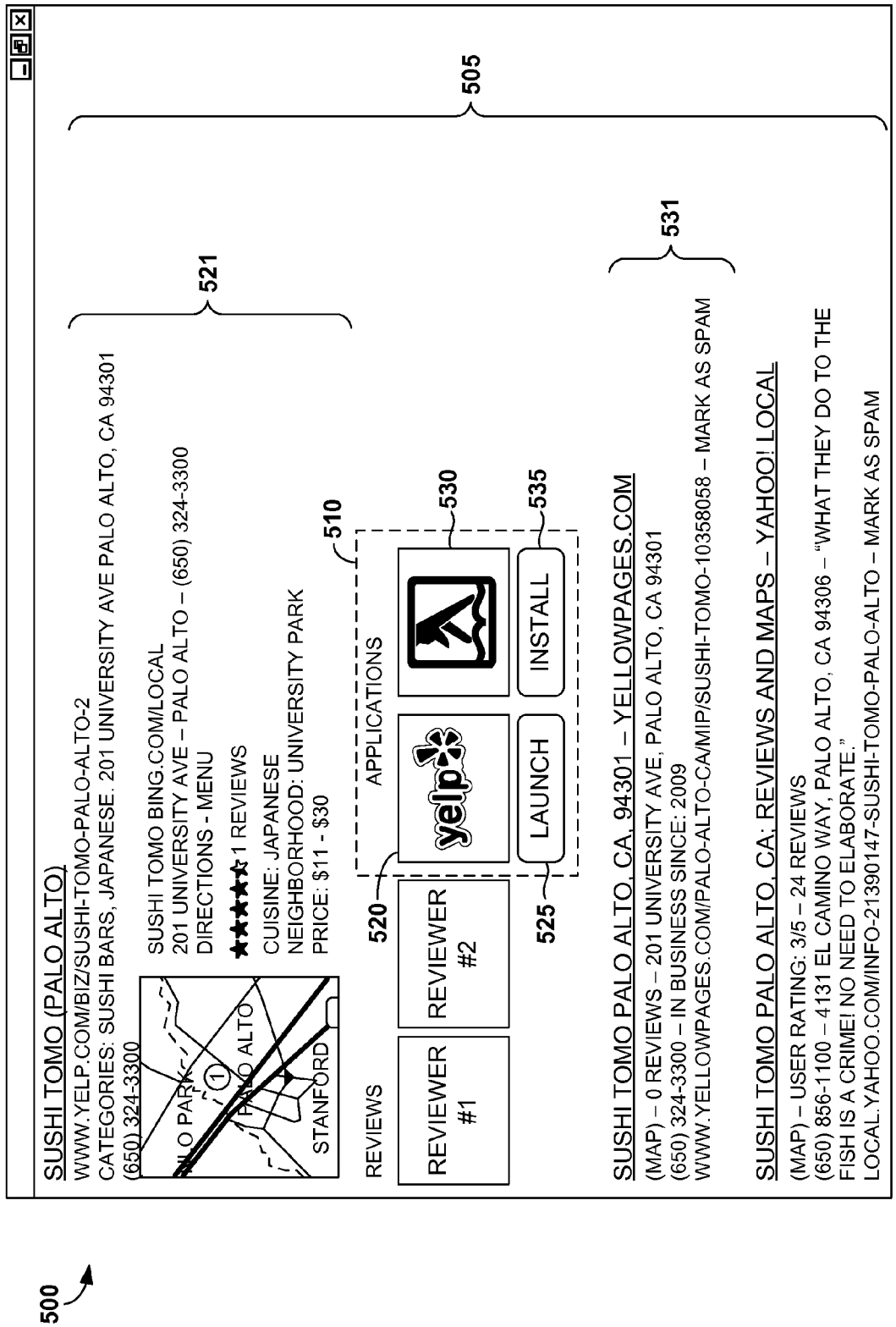
FIG. 5 is a schematic diagram depicting a first illustrative UI display that includes a representation of applications surfaced concurrently with search results, in accordance with embodiments of the invention.

Turning now to FIG. 3, a rendering component 278 may be provided within the search engine 275 for placing a visual representation of at least one application in a location on a layout of a search-result page. As depicted at operation 430, the rendering component 278 is enabled to place representations of the top-rated applications 330 within the search-results page as a function of one or more criteria. For instance, when the criteria indicates the real estate available within the search-results page is limited, the rendering component 278 may elect to restrict the number of top-rated applications 330 rendered at the search-result page. In one instance, the available real estate may be limited when descriptions of websites returned as search results are set to occupy a majority of the space within a display area 600 of FIG. 6. In contrast, if the search-results page is preconfigured with sufficient real estate, then the rendering component 278 may select additional top-rated applications 330 for display. In one instance, the real estate may be deemed sufficient when there exists display space 510 of FIG. 5 allocated and reserved for surfacing applications.

Figure 4A:
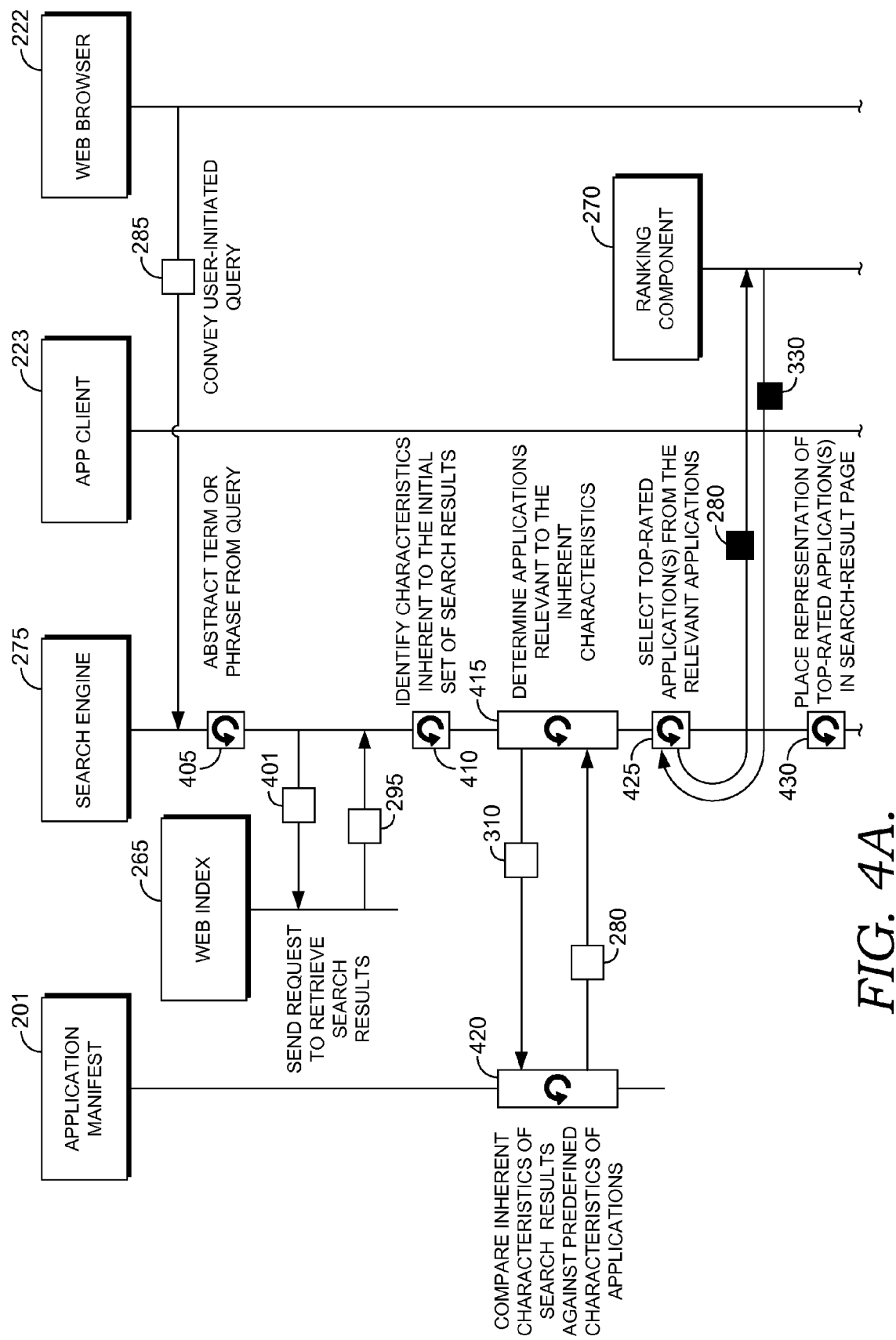
FIGS. 4A-4C depict an operational flow diagram illustrating a high-level overview of a technique for discovering apps and interacting with the discovered apps, in accordance with embodiments of the present invention.
Figure 4B:
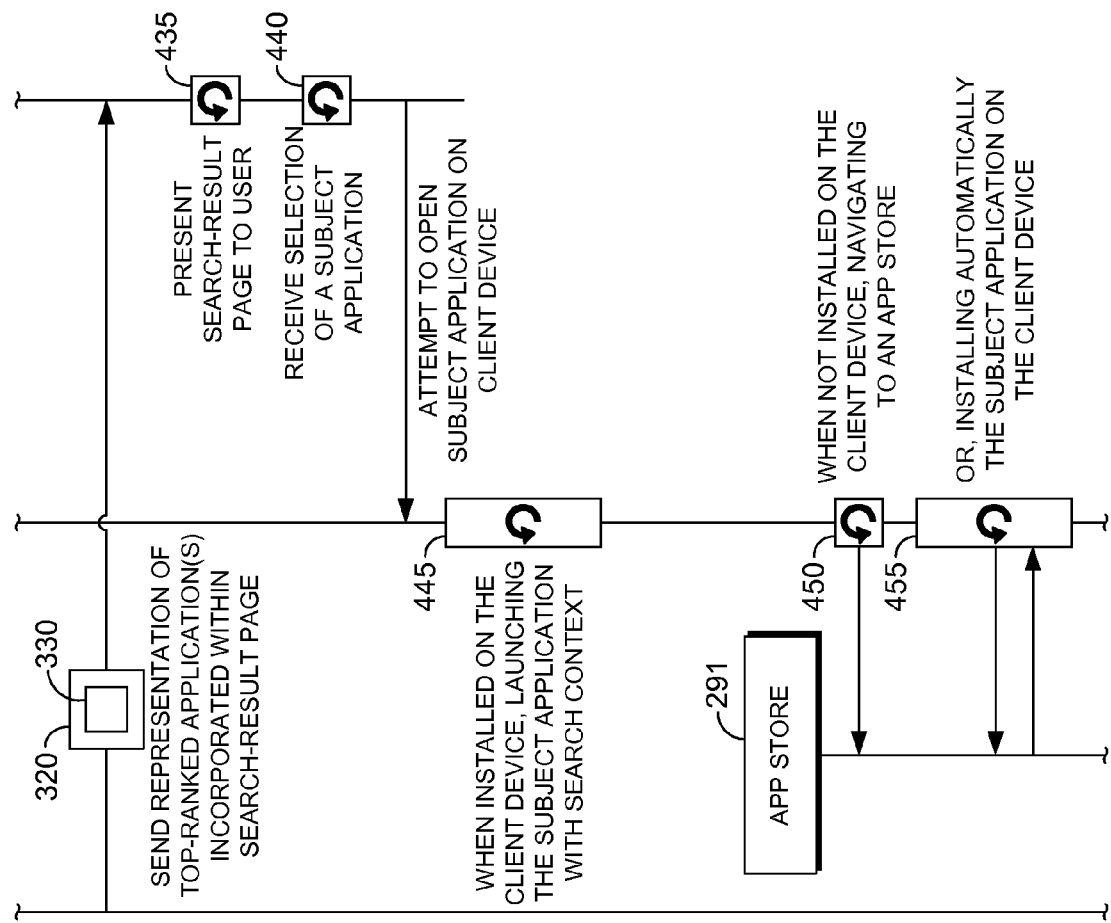

In another embodiment, the criteria used by the rendering component 278 to place representations of the top-rated applications 330 within the search-results page may involve a number of the top-rated applications 330 identified by the selection component 277. For instance, if only two top-rated applications 330 are identified, then just those top-rated applications 330 are sent via transmission 320 to the web browser 222 for incorporation within the search-result page, as illustrated at FIG. 4B.

Upon receipt of the transmission 320, the web browser 222 may present representations of the top-rated applications 330 within a search-result page, as depicted at operation 435. In embodiments, presenting representations of the top-rated applications 330 within a search-result page may comprise placement of the top-rated applications 330 search-results page based on structure of the search results 295. For instance, with respect to FIG. 5 (illustrating a schematic diagram depicting a first illustrative UI display 500), the web browser 222 may surface representations of applications 520 and 530 separately from the search results 521 and 531 within the search-results page 505.

As shown, these applications 520 and 530 may be surfaced within a display space 510 allocated and reserved for applications. As such, this specific area within the search-results page 505 being referred to as the display space 510 is configured to visually separate the applications from the remainder of the search results 521 and 531. Although shown in the middle of the search-results page 505, the display space 510 may be located at the top, bottom, or any other portion of the search-results page 505, as governed by the rendering component 278. In one instance, the size and location of the display space 510, and/or the number of applications indicated therein, is based on the number of top-rated applications 330 selected for inclusion within the search results 295.

However, as shown, the grouping of the applications 520 and 530 within the display space 510 are disassociated from the individual search results 521 and 531 and do not provide context as to why the applications 520 and 530 were selected or how they relate to the query and/or search results 521 and 531. Accordingly, the rendering component 278 may employ the structure of the search-results page 505 when the selection component 277 indicates a high level of confidence in the relevance of the applications 520 and 530 and/or it is readily apparent that the applications 520 and 530 are responsive to the query or satisfy the user's intent behind the ongoing search event.

In other embodiments, placement of the top-rated applications 330 within search-results page may include locating a representation of the applications selected for surfacing proximate to or in association with a particular search result. For instance, with reference to FIG. 6, a schematic diagram depicting a second illustrative UI display is illustrated that includes the display area 600 having representation an application 610 surfaced proximate to a relevant search result 615, in accordance with embodiments of the invention. As shown in FIG. 6, the representation of the application 610 is located proximate to the search result 615. This in-line presentation of the application 610 visually indicates an association between the application 610 and the search result 615. As discussed more fully above, the association between the application 610 and the search result 615 may be maintained within the application manifest 201 of FIGS. 2 and 3, and may be derived from one or more of the following: the web address of the search result 615 exhibits parity with the application 610; the capabilities of the application 610 are relevant to the content of the search result 615; and the characteristics of the search result 615 and the application 610 match a common, predefined entity.

As illustrated at FIG. 6, each of the applications that are presented, including the application 610, have a distinct search result (e.g., search result 615) associated therewith. Typically, this association is communicated to the user by presenting the application in proximity with the search results 615; however, other ways to link search results and applications may be used. Often, a one-to-one relationship between the applications and the search results is presented, in order to provide the user with a consistent search experience. Additional search results and relevant applications will become visible as a user scrolls upward or downward on the exemplary display area 600.

In this way, the structured placement of the application 610 proximate to or in-line with the associated search result 615 implicitly provides the user with information about why the application 610 is relevant to the query. That is, the spatial pairing of the application 610 and the search result 615 within the search-results page 605 intuitively explains to the user how the application was inferred from the query. As a result, if the user is interested in the search result 615, the in-line location of the application 610 may signal to the user that the application 610 may also be of interest for similar reasons. Further, the spatial pairing informs the user about the context of the entry point at which the application 610 will be launched upon selection. For example, if the Cooking Mama® application 610 were launched from the search-results page 605, the proximity of the application 610 to the search result 615 (describing a recipe for chicken pizza) may alert the user that, upon selecting the application 610, the context of the entry point of Cooking Mama® might pertain to chicken pizza.

Returning to FIG. 4B, upon presenting a search-result page to the user as indicated at operation 435, a selection of a subject application listed in the search-result page may be received. In embodiments, the selection may comprise a user-initiated selection (e.g., mouse click or hover action) directed toward a representation of an application surfaced in-line within the search results. For instance, with reference to FIG. 6, a selection made within a boundary of the representation of the application 610 may invoke an action with respect to the application 610. In another instance, with reference to FIG. 5, control buttons 525 and 535 may be provided for launching or installing the applications 520 and 530 respectively. In operation, a selection directed toward the control button 525 may launch the Yelp® application 520 directly from the search-result page 505, while a selection directed toward the control button 535 may install the directory application 530 to the client device 210 to be indexed with the installed apps 221 of FIG. 2.

Upon receiving the selection of the subject application at the web browser 222, the web browser 222 may attempt to open the subject application on the client device 210. As depicted at operation 445, when the subject application is installed on the client device 210, the subject application is launched directly from the search-results page. However, when the subject application is not installed on the client device 210, the web browser 222 may automatically navigate the user to a website that sells the subject application (e.g., app store 291 of FIG. 2), as depicted at operation 450. Or, the app client 223 running on the client device 210 may automatically install the subject application thereon, as depicted at operation 455.

In an exemplary embodiment, as shown in FIG. 2, the app client 223 is designed to detect whether the subject application currently resides on the client device 210 by acting as an interface between the web browser 222 and catalogue(s) of the installed apps 221. In one instance, the app client 223 is configured as a protocol handler and/or system-provided application programming interface (API). Upon an application being installed to the client device 210, the installed application is registered with the protocol handler. Thus, the installed application now can be launched by invoking a protocol known to the protocol handler. In operation, upon receiving an indication that a user has selected the subject application from the search-results page, the web browser 222 may convey the selection indication to the protocol handler (e.g., app client 223) that, in turn, issues an "open" command or invoke call to the installed apps 221. If the subject application is launched in response to the command, then the app client 223 understands the subject application is installed to the client device 210. If the subject application is not launched, then the app client 223 understands the subject application is not installed to the client device 210 and offers the user the option to download the application from the application marketplace 290. As such, by leveraging the protocol-handler capability of the app client 223, the detection of the subject application within the installed apps 221 is relatively efficient and does not require the acquisition of a list of the installed apps 221 for a labor-intensive lookup.

In one instance, the detection of applications that are installed to the client device 210 may be performed incident to adding the top-rated applications to the search results. In this way, the protocol-handler mechanism of the app client 223 may be invoked upon the web browser 222 receiving notification from the search engine 275 that one or more applications are selected for inclusion within the search-results page. The app client 223 may then inspect the installed apps 221 via any know process (e.g., detection using the "open" command) to determine whether the application(s) selected for rendering are actually installed on the client device 210. If so, the app client 223 may instruct the web browser 222 to modify presentational aspects of the application(s) being rendered such that the user is notified the application(s) were previously downloaded to the client device 210 (e.g., modifying the control button 525 to indicate that a click-action applied thereto will launch the application). If not, the app client 223 may instruct the web browser 222 to modify presentational aspects of the application(s) being rendered such that the user is notified the application(s) are not installed to the client device 210 (e.g., modifying the control button 535 to indicate that a click-action applied thereto will install the application).

Figure 4C:
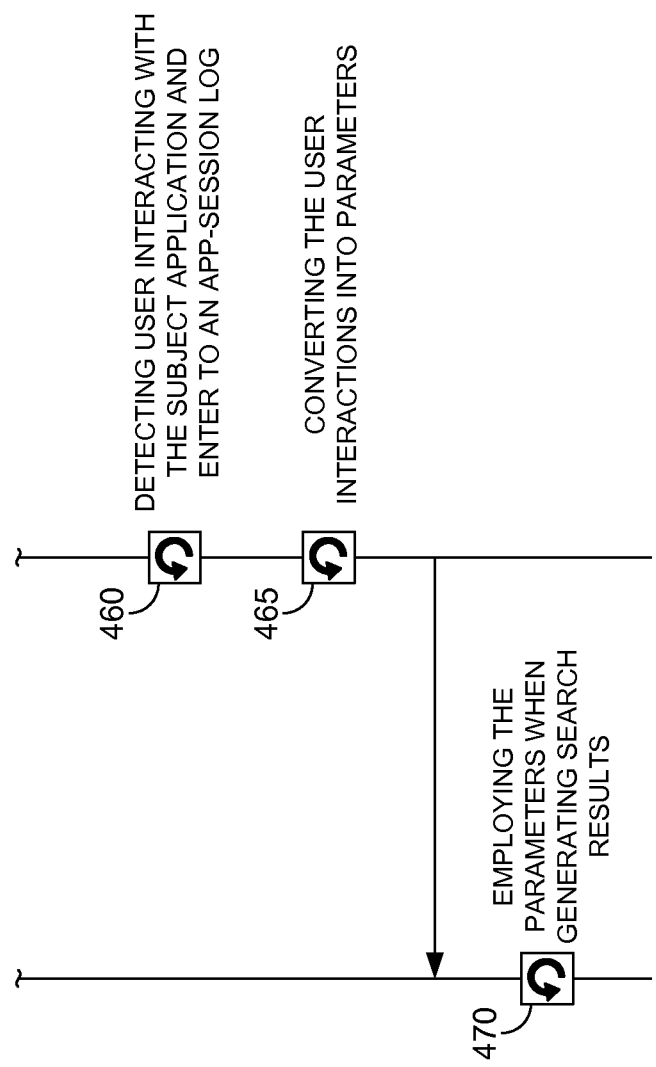

Turning to FIG. 4C, upon the user directing a selection to the subject application that invokes the subject application to launch, context (e.g., the user's interactions with the web browser 222 of FIG. 2) may be transferred to the subject application for establishing an advanced entry point, as opposed to a root entry point that is configured as the default start-up homepage for the subject application. This context may be, in certain circumstances, based upon user interactions with the search engine 275. For instance, the search engine 275 may record the current and/or previous queries within the search event (e.g., utilizing the data stores 230) and derive a context from the terms and phrases within the queries. This context may then be converted into parameters that are plugged-in to the subject application during launch, thereby taking the user directly to the contents, or advanced entry point, relevant to the query.

One way to derive context, as mentioned above, involves parsing at least one query and using the keywords from the query to manipulate the launched application. Another way involves parsing web addresses of search results that are associated with applications selected for presentation. In the example query "Italian restaurants Bellevue reservation," the URL (e.g., "www.urbanspoon.com/Seattle/Bellevue/Italian-Restaurants") returned as part of the search results may provide a context. In this case, the context indicates the user is looking for Italian restaurants in a location of Bellevue, Wash. This context is then converted to parameters and plugged-in to the Urbanspoon® application upon launch. With reference to the example query above, the process of converting into parameters may include recognizing an intent behind keywords within the query and attaching categorizing indicators to the keywords, such as the following: domain=restaurants; cuisine=Italian; location=Bellevue; and task=reservation.

The process of plugging-in the parameters of a search-event context to a launched application may involve the following steps: determining the proper information the application requires to navigate to an advanced entry point; and determining the format of the parameters that will likely be accepted by the application in order to properly interface with the user. For instance, an application may be designed to parse a raw, non-manipulated query or URL without the use of specialized parameters, thus, obfuscating the need to convert the context at the app client 223. In another instance, the app client 223 may be triggered to recognize a preferred format of the launched application in order to properly pass the context as parameters and in order to properly interface with the launched application. As such, the app client 223 may act to bridge a communication gap between the search-event context and launched application.

For example, if a restaurant is searched via a query and the responsive search results include the Yelp® application, the app client 223 may recognize that the Yelp® application requires pre-processing applied to the query prior to passing data to the Yelp® application during launch. In this case, the pre-processing may include extracting a business identifier (ID) from the query and passing the business ID of the searched restaurant to the Yelp® application for entry into an argument designated for the business-ID data type. As a result, the Yelp® application will launch to an advanced entry point that is associated with the searched restaurant.

Further, the launched application may return parameters back to the app client 223 upon the user interacting with the application. These parameters may be employed by the web browser 222 when attempting to generate search results from the search engine 275, as depicted at operation 470 of FIG. 4C. That is, parameters that indicate a context at the launched application (e.g., user actions performed, data entered, or links selected when interfacing with application) may be passed from the launched application to the app client 223 for subsequent use in searching. In operation, upon the user providing information to the launched application during an app session or upon the user terminating the app session, the information is passed to or gathered by the app client 223 for active or passive use with the search engine 275. Active usage includes automatically submitting the context to the search engine 275 in order to generate a new set of search results that incorporate the context from the application. For instance, if a user selects a particular movie in a cinema-based application, the selected movie and/or related information (e.g., movie location, movie show-time, or movie theater) is saved and returned to the search engine 275 for further use. This further use may include generating a new set of search results that are tailored to the selected movie (e.g., a restaurant or parking lot near the theater of the movie, or a director of a movie).

Generally, passive usage includes storing the context for eventual use at appropriate times. For instance, the web browser 222 may append some or all of the context to a subsequent query without the user's knowledge in order to further personalize the search results. Or, the context may be used to modify a user profile maintained and updated at the data stores 230. The user profile may then be intermittently employed to improve the relevance of the subsequent searches.

Figure 9:
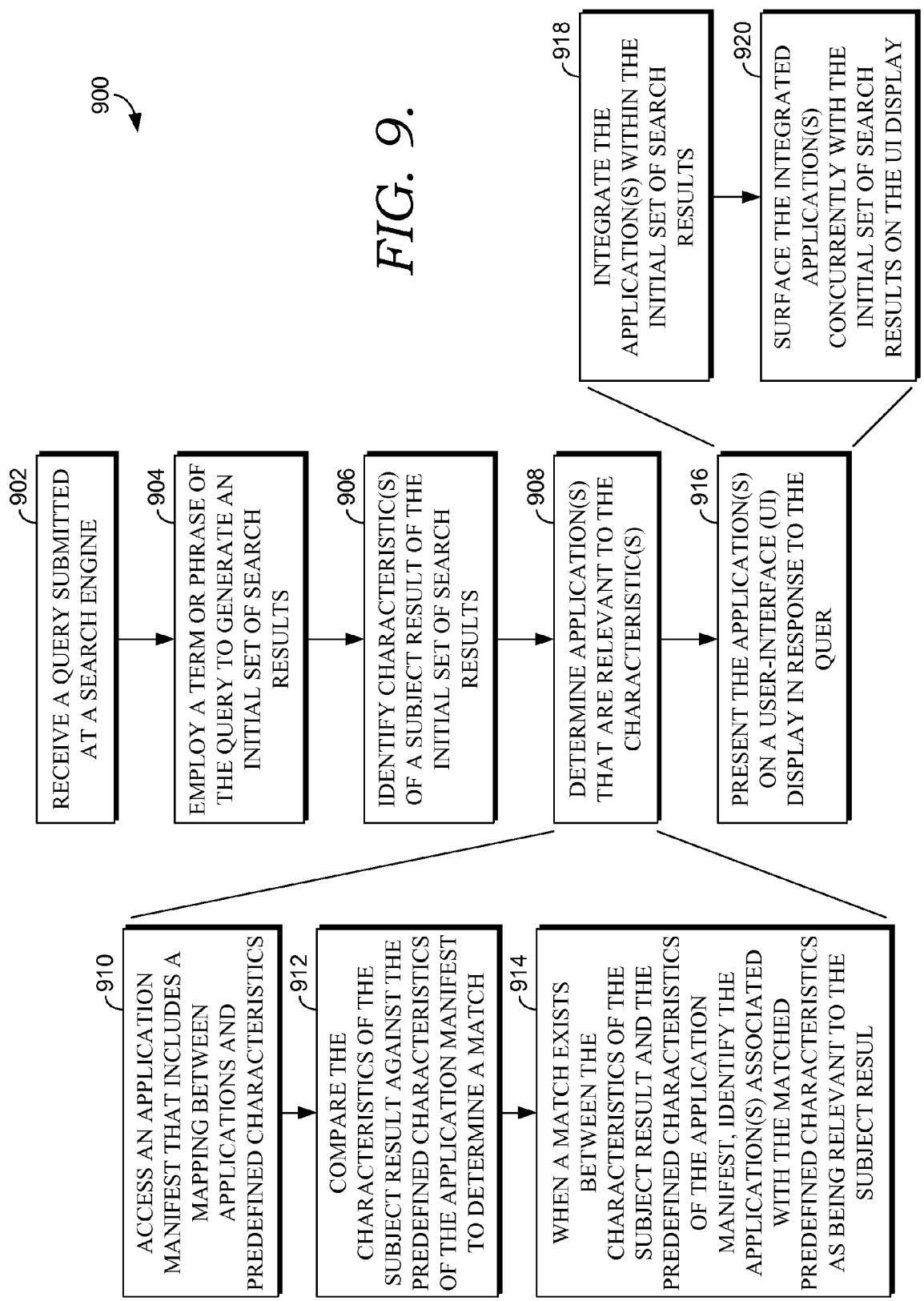
FIG. 9 is an overall flow diagram of a method for surfacing one or more applications as a function of search results, in accordance with embodiments of the invention.

Turning now to FIG. 9, an overall flow diagram of a method 900 for surfacing one or more applications as a function of search results is shown, in accordance with embodiments of the invention. Although the terms "step" and/or "block" may be used herein to connote different elements of methods employed, the terms should not be interpreted as implying any particular order among or between various steps herein disclosed unless and except when the order of individual steps is explicitly described. Initially, the method 900 comprises the steps of receiving a query submitted at a search engine (see block 902) and employing a keyword (e.g., term or phrase) of the query to generate an initial set of search results (see block 904). The method 900 may further comprise identifying characteristic(s) of a subject result of the initial set of search results (see block 906) and determining application(s) that are relevant to the characteristic(s) (see block 908).

This determination of application(s) that are relevant to the subject result's characteristics may include one or more of the following steps: accessing an application manifest that includes a mapping between applications and predefined characteristics (see block 910); comparing the characteristics of the subject result against the predefined characteristics of the application manifest to determine a match (see block 912); and, when a match exists between the characteristics of the subject result and the predefined characteristics of the application manifest, identifying the application(s) associated with the matched predefined characteristics as being relevant to the subject result (see block 914). These identified application(s) may be presented on display in response to the query, as depicted at block 916. In a particular instance, presenting may involve integrating the application(s) within the initial set of search results (see block 918) and surfacing the integrated application(s) concurrently with the initial set of search results on the UI display (see block 920).

Figure 10:
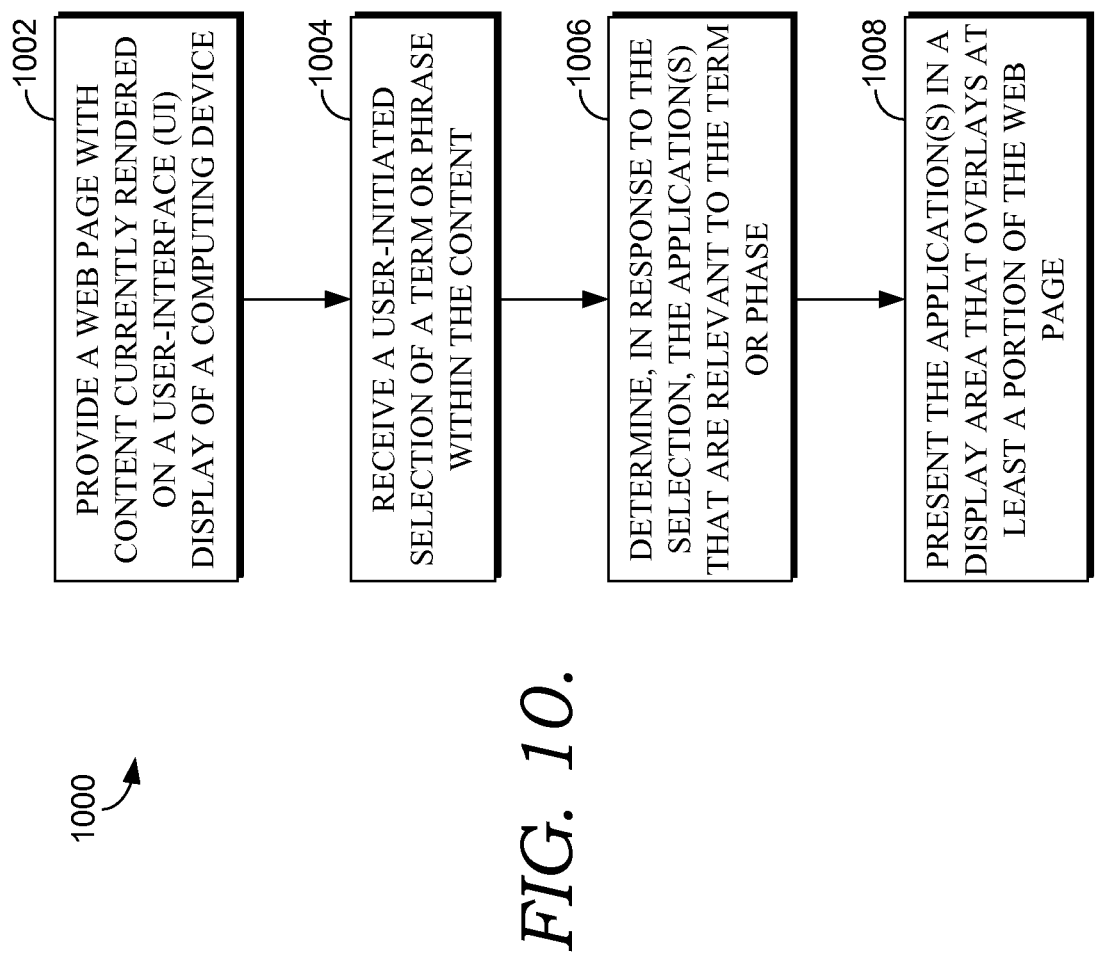
FIG. 10 is an overall flow diagram of a method for surfacing at least one application during review of a web page, in accordance with embodiments of the invention.

With reference to FIG. 10, an overall flow diagram is shown illustrating a method 1000 for surfacing at least one application during review of a web page, in accordance with embodiments of the invention. The discussion of this method 1000 will coincide with the discussion of a third illustrative UI display illustrated in FIG. 7 that includes a display area 700 exposing application information 730 and link(s) 725 overlaying content 705 of a web page, in accordance with embodiments of the invention. The method 1000 may initially involve rendering a web page or document with the content 705, or text, within the display area 700 (e.g., browser window 225 of FIG. 2) on a UI display of a computing device (see block 1002).

Figure 7:
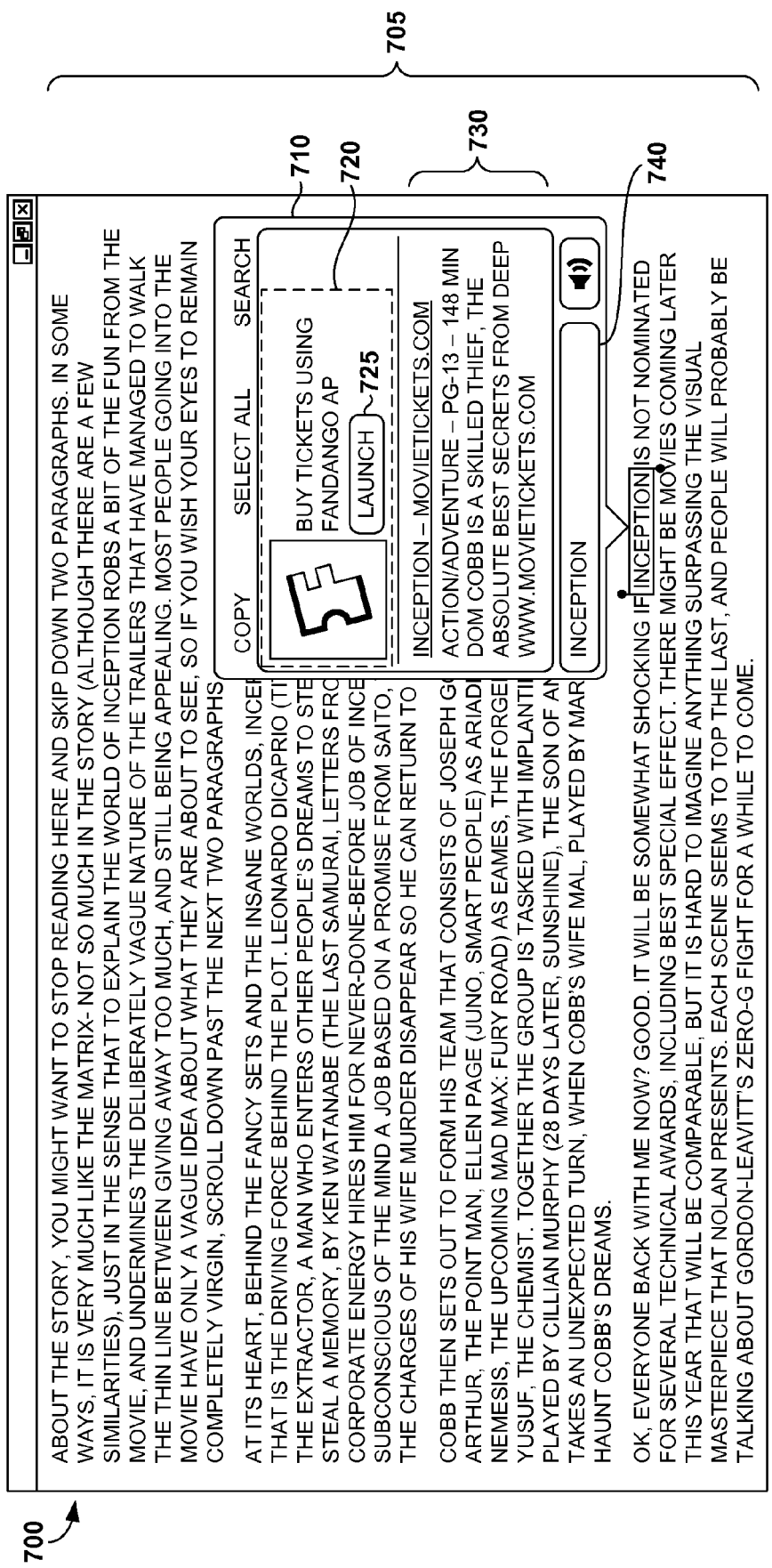
FIG. 7 is a schematic diagram depicting a third illustrative UI display that includes a display area configured for exposing application information and for overlaying content of a web page, in accordance with embodiments of the invention.

In instances, the method 1000 may include the steps of receiving a user-initiated selection of a term or phrase within the content 705 (see block 1004). As illustrated, the selection of the term or phrase (e.g., "inception") may occur via one of various ways, such as a word-finder tool 740 or manually highlighting. In response to the selection, the application(s) 720 that are relevant to the term or phase are determined (see block 1006). This determination of the relevant application(s) 720 may be carried out by any of the processes described above, such as the employment of the application manifest 201 of FIG. 2. These relevant application(s) 720 may then be presented in a pop-up display window 710 that overlays at least a portion of the display area 700 (see block 1008). As illustrated in FIG. 7, the display window 710 includes the application information 730, a representation of the application 720, and the link 725 to the application 720.

Figure 11:
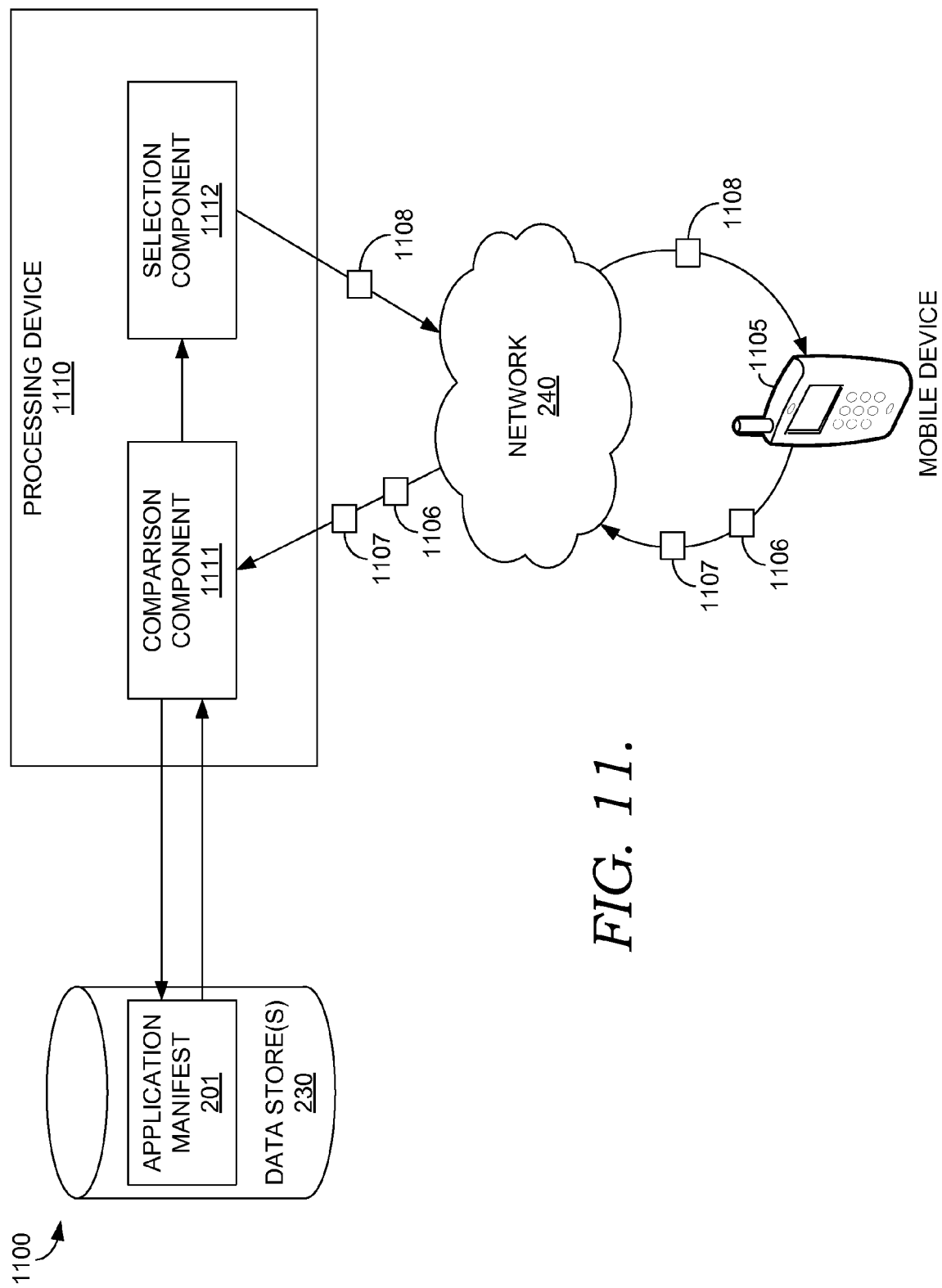
FIG. 11 is a block diagram of an exemplary system architecture of a distributed computing environment configured for use in implementing embodiments of the present invention.

Additional embodiments of the present invention will now be described with reference to FIGS. 11-18. The embodiments involve constructing an application manifest with a mapping between apps and geographic boundaries and employing the application manifest, upon receiving a location signal from a mobile device, in order to identify apps that are valid for the particular location of the mobile device and/or submitted to the mobile device by a user. Turning now to FIG. 11, a block diagram of an exemplary system architecture 1100 of a distributed computing environment configured for use in implementing embodiments of the present invention will now be described.

Generally, implementing embodiments of the present invention relate to discovering apps in response to a location signal (e.g., location-based information entered to or gathered by a mobile device) and presenting those apps as search results to a user (e.g., rendering the apps in-line with websites on a search-result page of a UI display). It should be understood and appreciated that the exemplary system architecture 1100 shown in FIG. 11 is merely an example of one suitable computing environment and is not intended to suggest any limitation as to the scope of use or functionality of the present invention. Neither should the exemplary system architecture 1100 be interpreted as having any dependency or requirement related to any single component or combination of components illustrated therein.

Initially, the exemplary system architecture 1100 includes the application manifest 201 (discussed above with reference to FIGS. 2 and 3), a mobile device 1105, the data store(s) 230 (discussed above with reference to FIG. 2), a processing device 1110, and a network 240 that interconnects each of these items. Each of the mobile device 1105, the data stores 230, and the processing device 1110 shown in FIG. 11, may take the form of various types of computing devices, such as, for example, the computing device 100 described above with reference to FIG. 1. By way of example only and not limitation, the mobile device 1105 and/or the processing device 1110 may represent or include a personal computer, desktop computer, laptop computer, consumer electronic device, handheld device (e.g., personal digital assistant), various servers, processing equipment, a processor as defined above, and the like. It should be noted, however, that the invention is not limited to implementation on such computing devices but may be implemented on any of a variety of different types of computing devices within the scope of embodiments of the present invention.

Typically, each of the devices 1105 and 1110 includes, or is linked to, some form of computing unit (e.g., central processing unit, microprocessor, processor, etc.) to support operations of the component(s) running thereon (e.g., comparison component 1111, selection component 1112, and the like). In general, processing device 1110 is provided for identifying a set of valid applications upon receiving location-based information (e.g., location signals 1106) and/or task-based information (e.g., task signals 1107) from the mobile device 1105. The data store 230 is configured for hosting an application manifest 201, which exposes a listing of applications mined from an application marketplace (as described above). Generally, the applications within the listing are mapped to respective geographic boundaries and categories.

The mobile device 1105 is typically configured for providing the location signals 1106 and/or the task signals 1107 either automatically or in response to a command from a user of the mobile device 1105. The "location signal" 1106 generally represents location-based information entered by a user of the mobile device 1105 (e.g., a search that relates to a specific location or place) or derived from a geographic position of the mobile device 1105 (e.g., using the GPS tracking of the device's movements). On the other hand, the "task signal" 1107 generally represents task-based information that exposes user-initiated operations performed on the mobile device 1105.

The processing device 1110 is configured for receiving the location signal 1106 and/or the task signal 1107 from the mobile device 1105 via the network 240. In one embodiment, the comparison component 1111 of the processing device 1110 is configured for comparing the location signal 1106 against the application manifest 201 to identify one or more applications mapped to geographic boundaries that are valid with respect to the location signal 1106. In another embodiment, the comparison component 1111 of the processing device 1110 is configured for comparing the task signal 1107 against the application manifest 201 to identify one or more applications mapped to categories that are relevant with respect to the task signal 1107. Further, the selection component 1112 of the processing device 1110 may carry out a process for selecting applications 1108 from an overlapping set of the valid applications and the relevant applications. These selected application 1108 may be sent to the mobile device 1105 via the network 240 for display thereon.

A discussion of the construction or modification of the application manifest 201 to include a mapping between apps and geographic boundaries will now commence. Initially, location entities for apps are discovered. These "location entities" relate to any places, locations, items, or characteristics that have a definite geographic representation. For example, location entities that may be discovered for Southwest Airlines® may include the location of airports that serve as hubs, the city and state of the corporate headquarters, places the sell airline tickets, retailers that provide vacation packages, affiliated airline services, and the like. In another example, a location entity for a sports application may be the location of a sports stadium. This exemplary location entity may be discovered using telemetry data (i.e., determining that there is an increased usage, downloads, launching, etc. of the sports application within the proximity of the sports stadium). It should be noted that the use of phrase "location entities" and the term "locations" are used interchangeably herein, and are not intended to represent disparate concepts.

In yet another example, a location entity for a tourism application may discovered using local intent. The "local intent" generally refers to any attributes of the application that can be interpreted to target a specific place or location. For instance, metadata submitted within or accompanying the tourism application may include a name or description of cities in which the tourism application is applicable.

In still another example, a location entity for a hiking-trail application may be discovered using geographic, or "geofence," boundaries corresponding to the hiking trail application. As used herein, the phrase "geographic boundaries" is not meant to be limiting, but may encompass a scope of global coverage that is valid or relevant for a given application. In the case of the exemplary hiking-trail application, the geographic boundaries may include a state-level area when the hiking-trail application relates to a trail that traverses a substantial portion of a particular state. In operation, when the location signal 1106 from the mobile device 1105 indicates that the mobile device 1105 is presently positioned within the particular state, the hiking-trail application may be considered as a possible candidate for presentation on a UI display of the mobile device 1105.

In one instance, the geographic boundaries for an application may be discovered by determining the geographic boundaries for each of the location entities, location intents, and telemetry data associated with the application. The geographic boundaries may also be sized to succinctly capture the area(s) most relevant or intuitive to the application, where some example dimensions of geographic boundaries include block level, city level, county level, state level, country level, or other sizes of tiles on the surface of the earth. Accordingly, in embodiments, the geographic boundary(s) discovered for the application likely encompass areas that exhibit a high level of usage of the application with respect to other areas not included within the geographic boundaries.

Once the valid geographic boundaries are discovered for a subject application, an offline process for linking the valid geographic boundaries to the subject application commences. In one embodiment, the process for linking includes tagging the subject application with corresponding locations entities and/or geographic boundaries that are discovered to be valid for the subject application. In one instance, tagging involves explicit tagging. Explicit tagging includes accessing the metadata that is explicitly submitted with the subject application when a developer registers the subject application with an app store. In one instance, the developer is provided with tools at user-interface that expressly solicit and collect location-based information (e.g., specific locations believed to be relevant to the subject application are entered by the developer) when the developer is attempting to upload the subject application to an online catalogue or other resource within the application marketplace. The specific locations may be associated with the subject application. Geographic boundaries may be identified for each of the specific locations. These identified geographic boundaries may then be linked to the subject application within the application manifest via an explicit tag.

In another instance, tagging involves implicit tagging. Implicit tagging generally refers to an offline process that relies on logic to distill locations from implicit information surrounding the subject application. In this case, locations may be distilled by reading a name of the subject application and/or a description of the subject application from the metadata surrounding the subject application. For example, metadata that includes the phrase "Train System in NYC" within a name or description can be identified as being valid for the city of New York City, where the geographic boundary is sized on the city level and the location entity focuses on the transportation routes and stations within downtown New York City.

As such, the metadata explicitly reveals the location entity and the geographic boundary for the subject application. In situations where the metadata explicitly reveals the location for the subject application, the subject application may be linked to the location using direct mapping. Generally, "direct mapping" involves reading the location from metadata and tagging the subject application with the location without the use of significant extrapolation or interpretation.

In another example, the metadata may include within a name or description of the subject application the phrase "Rides for Disneyland." The point of interest Disneyland can be distilled from the metadata and identified as a point of interest. Although, Disneyland is a point of interest as opposed to a specific location, the processing device 1110 is provided with logic to determine the specific locations that are related to certain points of interest. In this example, for the point of interest of Disneyland, the specific city of Orlando, Fla., may be known to correspond with Disneyland and may be used to establish the location and size of the geographic boundary for the subject application associated with "Rides for Disneyland."

As such, the metadata implicitly reveals the location entity and the geographic boundary for the subject application upon processing the point of interest. In situations where the metadata implicitly reveals the location for the subject application, the subject application may be linked to the location using indirect mapping. Generally, "indirect mapping" involves extracting some information (e.g., point of interest) from metadata and tagging the subject application with a location that is extrapolated or interpreted from the extracted information.

In yet another example, the metadata may indicate that the subject application relates to a chain of business with various physical locations. For instance, if the subject application relates to the electronics retailer Best Buy, the processing device 1110 of FIG. 11 may conclude that there are multiple locations at which the subject application is relevant. Accordingly, those multiple locations may be discovered by referencing a directory (e.g., telephone/address listings) that exposes the geographic positions of Best Buy stores. These geographic positions may be aggregated and mapped (e.g., via indirect mapping of a business name to particular location(s)) to the subject application within the application manifest 201.

Or, a mechanism employed by the processing device 1110 may be used to determine the subject application's most relevant locations by tracking the locations that users most frequently/recently use the subject application. Initially, telemetry data may be accumulated over time from users of the subject application. As used herein, the phrase "telemetry data" refers to the locations of high usage of the subject application (e.g., locations of comparatively higher user activity, downloads, or launches with respect to the frequency of use at other locations), which may influence the suggestions provided by the selection component 1112. Thus, the telemetry data may be used identify locations of high usage that are indirectly mapped to the subject application.

With respect to the Best Buy application example, analysis of the accumulated telemetry data may show that the Best Buy application is accessed most often within the proximity of the known geographic positions of Best Buy stores, as opposed to within the actual premises of the Best Buy stores. Accordingly, the telemetry data may indicate that the Best Buy application may be more relevant when mapped to a larger-sized geographic boundary surrounding a Best Buy store. These larger-sized geographic boundaries that encompass some or all of the Best Buy stores can be indirectly mapped with the Best Buy application and saved to the application manifest 201.

Once the applications are directly or indirectly mapped with location(s) and/or geographic boundary(s), they may be categorized and ranked within their respective categories. In embodiments, categorizing involves organizing the applications into user-based and/or functional-based categories via either static categorization or dynamic categorization. Static categorization generally involves determining one or more discrete operations performed or offered by the subject application and matching those operations with a predefined listing of general categories. For instance, an application that provides a city-guide functionality may be categorized as a tourism app, an application with restaurant-review functionality may be categorized as a dining app, and an application with a local-news-station functionality may be categorized as a news app and/or a weather app.

Dynamic categorization is employed to reorganize the applications based on tasks being executed by the user of a mobile device 1105 and/or based on events or points of interest proximate to the user (e.g., tickets for a movie in Marymoor, Redmond). In one exemplary embodiment, dynamic categorization may be conducted to organize the applications into relevant tasks based on "task signals" that describe portions of the user's profile (e.g., history of the user's locations) and/or the user's actions being carried out on the mobile device 1105. In another embodiment, dynamic categorization may be conducted to organize the applications into relevant locations based on "location signals" that describe a physical position the mobile device 1105 and/or a location associated with a search on the mobile device 1105. These location signals can be can be implicit (e.g., based on signals such as device location, IP address, and the like) or explicit (e.g., keyword searches involving locations).

For example, the applications within the application manifest may be dynamically categorized as a user is walking through a mall. Initially, the processing device 1110 may take into account location signals that sort the applications within the application manifest 201 that relate to local businesses within the mall. Then, the processing device 1110 may consider the task signal 1107 that represent other criteria surrounding the task of going to the mall. In one instance, the task signal 1107 may capture the time of day, thereby determining whether the user is shopping or dining. In another instance, the task signal 1107 may capture the user's recent search history, thereby determining the type of goods the user is most inclined to purchase.

Once the applications are mapped to locations and categorized according to relevance, the applications may be further sorted by dynamically ranking the applications within categories using various criteria (e.g., attributes of the user's profile, social profile, location history, and the like) during runtime. In one instance, the criteria used to rank the applications may involve the detected current location of the user and/or a tracked location history of the user (e.g., determining whether the user is a tourist, local resident, or something in-between). In another instance, the criteria used for ranking may be derives from the user's profile. For example, if the user is currently at a location that is also designated in the user's profile as the user's home town, then the ranking algorithm may prefer local news and weather applications over tourism-type applications. Thus, ranking serves to place low importance on and filter out irrelevant applications from consideration, while surfacing the most valid application(s) for the time and place of the individual user.

In other instances, the criteria used for ranking applications within a category may consider previous searches by the user or known interests of the user (e.g., whether the user prefers free apps or paid apps, or whether the user already owns the app). In yet other instances, the criteria user for ranking may not be user-specific, but may be drawn other users. This non user-specific criteria may consider such things as the following: app popularity, number of downloads, reviews and rating, release date, trends in searches by others, and/or recent review in news or social media. As such, ranking generally results in moving highly relevant applications to the top of a category, thus, increasing the chance that the highly relevant applications will be selected by the selection component 1112 for surfacing on the mobile device 1105.

In operation, upon establishing the mapping of applications to locations within the application manifest, upon categorizing the applications either statically or dynamically, and upon ranking the applications within the categories, the mobile device 1105 location and/or user activities are monitored in order to present to the user the most relevant applications. As mentioned above, task signals 1107 and location signals 1108 are collected by the processing device 1110. In embodiments, as mentioned above, the task signals 1107 may represent searches issued to a search engine, calls placed at the mobile device 1105, and/or check-ins the user has made to an online website, while location signals 1106 may represent a location explicit or implicit within a search query or a current GPS location of the mobile device 1105. Although several specific task signals 1107 and location signals 1108 have been described herein, it should be appreciated and understood that there are many mobile activities which have location/task information associated thereto, and this location/task information is contemplated by the embodiments of the present invention for use in selecting and filtering applications.

Once the signals 1106 and/or 1107 are received or retrieved at the processing device 1110, the comparison component 1111 invokes an application search at the application manifest 201 using the signals 1106 and/or 1107, as well as any other mobile activities being monitored at the mobile device 1105. In one instance, invoking the search involves a triggering the search in response to a user entering a query that has an explicit location intent. In another instance, invoking the search involves a triggering the search in response a user performing some operation that is associated with a current (e.g., GPS position of the mobile device 1105) or potential location (e.g., inherent within the search query) of the user. As such, the comparison component 1111 is equipped to examine the application manifest 201 with information upon being explicitly or implicitly triggered.

The comparison component 1111 compiles a group of possible candidate applications from the application manifest 201 using the signals 1106 and/or 1107. This group of candidate applications are reviewed at the selection component 1112, which dynamically categorizes and ranks the applications, as discussed above, in order to provide a selection of applications 1108 for presentation to the user on a UI display of the mobile device 1105. There are various ways in which the selected applications 1108 are presented at the UI display.

These way are varied to address the differing operational contexts in which the mobile device 1105 is functioning. As used herein, the phrase "operational context" is not meant to be limiting, but encompass any state that a computing device, mobile device, laptop, tablet, etc. may assume while powered on.

Figure 12:
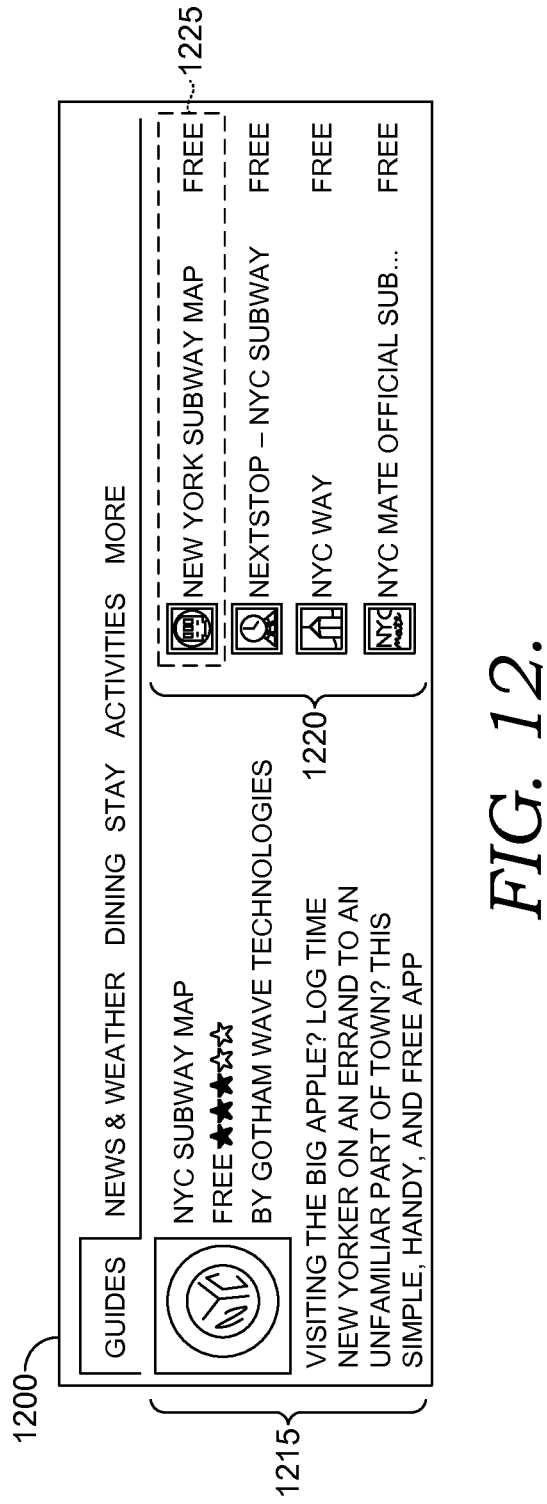
FIG. 12 is a schematic diagram depicting a fifth illustrative UI display that includes a representation of applications surfaced concurrently with location-based search results, in accordance with embodiments of the invention.

In one instance, with reference to FIG. 12, representation(s) of the selected applications 1108 may be surfaced concurrently on a UI display 1200 within the operational context of location-based search results 1215. That is, the selected applications 1108 may be provided as local task-based apps 1220 that are integrated with other search results on a search-engine results page (SERP) or a places/local page, such that the local task-based apps 1220 are recommended in response to a search query.

In an exemplary operation, the apps 1220 (i.e., selection of apps of the set of valid applications aggregated by the comparison component 1111) may be presented on the UI display 1200 in response to the query entered during an online search. In the instance illustrated in FIG. 12, the apps 1220 may have been discovered in response the query "trip to NYC," wherein the term "NYC" explicitly triggers the task signal of searching the location of New York City. Advantageously, the recommended apps 1220 are relevant to planning a trip to New York City (with the app 1125 being the highest ranked) at the same time the user is expressing interest in visiting New York City at the search engine. Further, the user may be located in another city (e.g., Chicago), as reflected in the location signal from the mobile device; however, the task signal may override the user's current location and surface the apps 1220 that are deemed to be of more interest to the user at that specific point in time.

Figure 14:
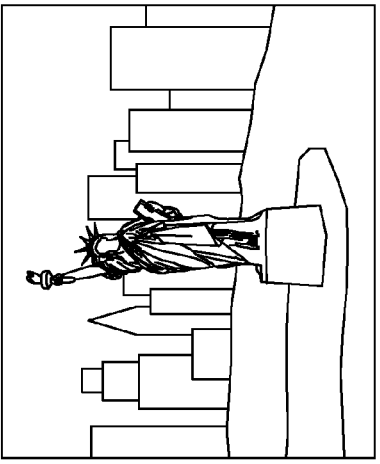

Turning now to FIGS. 13 and 14, schematic diagrams depicting illustrative UI displays 1300 and 1400 that include representations of applications surfaced proximate to relevant location-based entries on a search-result page are shown, in accordance with embodiments of the invention. With respect to FIG. 13, the query "New York" 1305 may be entered within a search-entry area 1301 when a user is conducting a search. A selection of apps 1335 may be discovered based on the query 1305 and integrated with the initial set of search results (e.g., search-result item 1330) such that the apps 1335 and the search-result item 1330 are presented concurrently on the UI display 1300.

As illustrated in FIG. 13, similar to FIG. 12, the explicit content or implicit user intent of the query 1305 substantially drives the determination of which apps 1335 to publish. However, the location of the user may also be considered when selecting applications that are relevant within the operational context of a search. In instances, the web browser may be equipped with logic to provide the user a vertical experience in which a set of pages are offered to tailor the search results to the user's intent. In one instance, when the "web-centered" page of FIG. 13 is chosen by the user, the selection of apps may relate to the content of the query 1305 and correspond with the theme of the search results.

Yet, when a "place-centered" page is chosen by the user, popular local apps near a current location may be deemed more relevant to user and surfaced. Or, the content (e.g., venues of place, attractions, and the like) within the search results may help dictate which apps are selected for presentation. In this case, the selected apps may be presented in areas that are allocated proximately to the individual search results with which the apps are respectively related. These popular local apps may also be published at a web-browser homepage prior to the entry of any query.

With reference to FIG. 14, the operational context may involve presenting the selection of apps 1335 of the set of valid applications on the place-centered page. Often, the place-centered page is published upon the user conducting an online search for a particular location, landmark, attraction, or point of interest. As with other web pages, the selection of apps 1335 may embedded within other content of the place-centered page.

Figure 16:
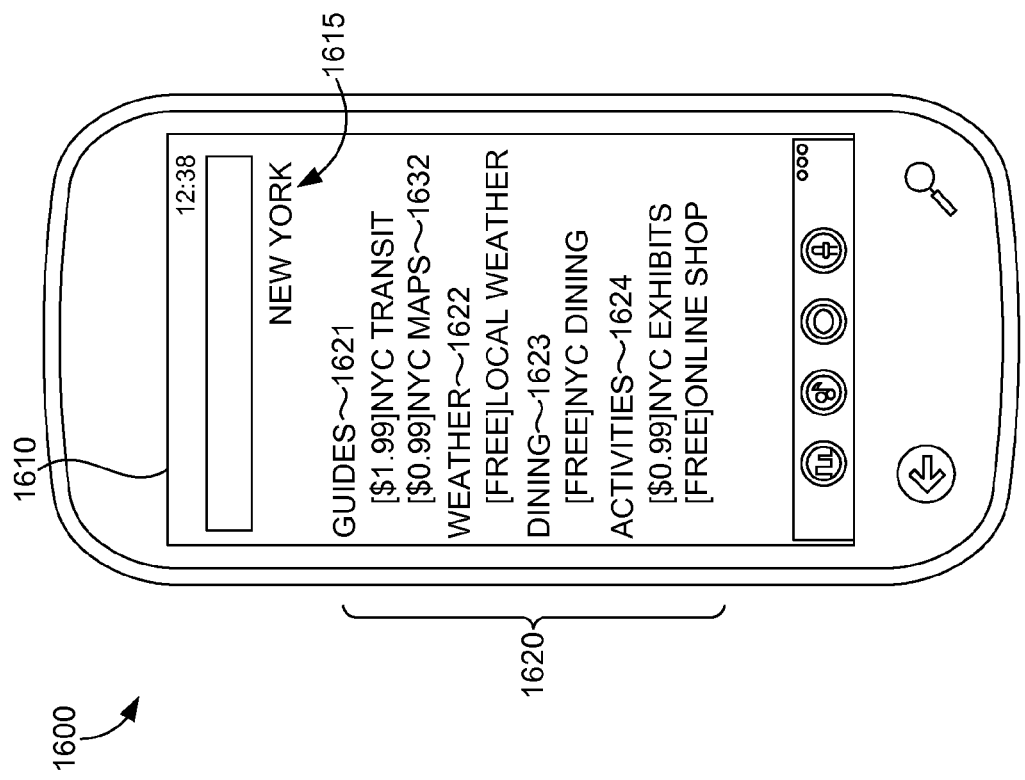
FIGS. 15 and 16 are a schematic diagrams depicting an eight and a ninth illustrative UI display that include representations of applications surfaced proximate to location-based items within a mobile device context, in accordance with embodiments of the invention.
Figure 15:
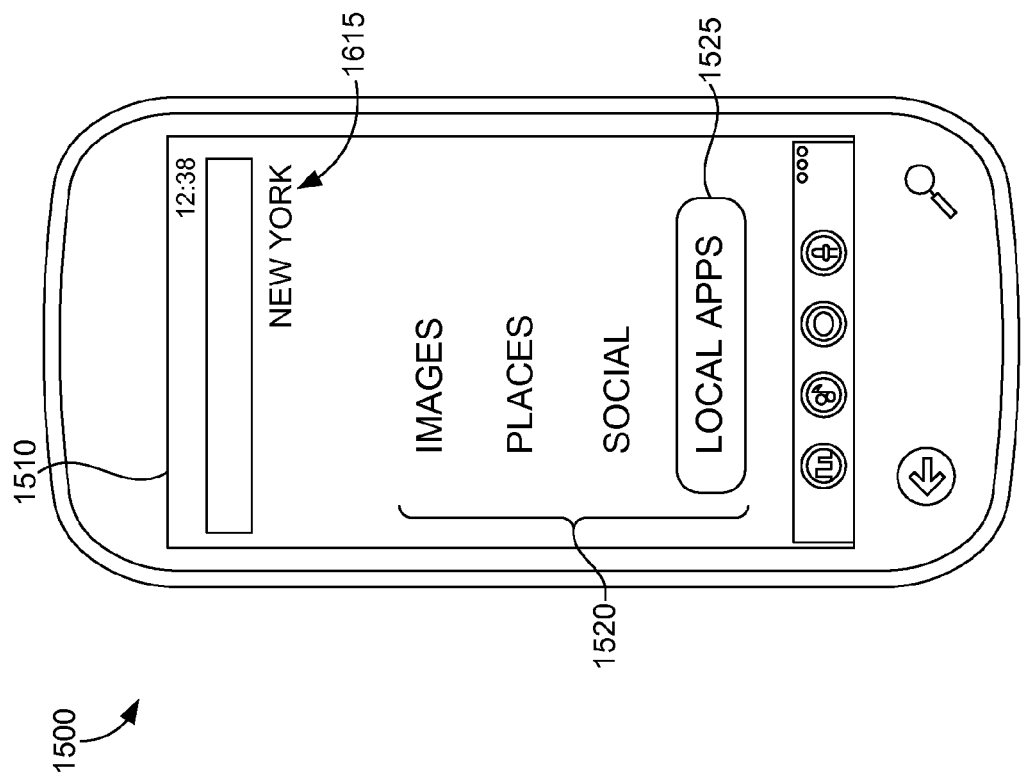

In another example, when the "local-centered" page is chosen by the user, as shown in FIG. 16, the operational context involves presenting the selection of apps 1620 of the set of valid applications on a local-centered page 1610 in response to the location 1615 of the user device. In embodiments, the local-centered page 1610 is published upon the recognizing a location of the user by monitoring geographic positioning of the mobile device. In operation, the local-centered page 1610 exposes content that describes businesses that are physically proximate to the location of the user. For example, if a user walks into Bellevue square, s/he gets notification of apps available around that location. Some apps include the following: movie app based on theater, coffee shops and other business apps. In some embodiments, the user is prompted to subscribe and unsubscribe to real-time location-sensitive app discovery.

The local-centered page 1610 of FIG. 16 may be arrived upon automatically by reading the location signals from the user's mobile device. Or, the local-centered page 1610 may be manually chosen from the UI display 1510 shown in FIG. 15. As illustrated, the UI display 1510 includes a listing 1520 of the various pages that a user may pick from. In operation, upon selection of the "local apps" representation 1525, the user may be directed to the local-centered page 1610 of FIG. 16. Selection of other representations within the listing 1520 may navigate the user to other pages, such as the web-centered or place-centered pages that are discussed above.

Embodiments of the present invention provide other entry points at which the selected applications 1108 of FIG. 11 can be surfaced. For instance, as mentioned above, the selected apps 1108 may be presented on a mobile homepage and/or a search homepage. Thus, the applications 1108 can be presented outside the confines of a search. In fact, the UI displays 1510 and 1610 of FIGS. 15 and 16 may be generated outside the operational context of a search using simply the signals 1106 and/or 1107.

In another example, the operational context outside the confines of the search involves presenting the selection of apps 1108 of the set of valid applications on a locked home screen of the mobile device. Generally, the locked home screen is encountered upon initially powering up the mobile device prior to user login. That is, the locked home screen is encountered prior to entering the appropriate credentials and arriving upon an unlocked home screen.

In yet another example, as mentioned above with reference to FIG. 15, an operational context outside the confines of a search may involve presenting a selection of apps in response to the user choosing the representation 1525 on the unlocked home screen 1500 of the mobile device. The unlocked home screen 1500 is encountered upon the user properly logging in after powering up the mobile device. In this instance, the physical location of the mobile device itself may dictate the content of the selection of apps 1525. Advantageously, the operational contexts of the home screen involves location signals alone, without requiring the user to perform any specific actions. Further, the selection of apps 1108 may automatically update while the user is moving (e.g., using internal software for sensing the change in location, which triggers the push of apps to the mobile device 1105). By way of example, the apps presented on the home screen may change to indicate various rides while the user is walking around the park in Disneyland, as changes in the user's location invoke updates to the apps on the home screen.

Figure 17:
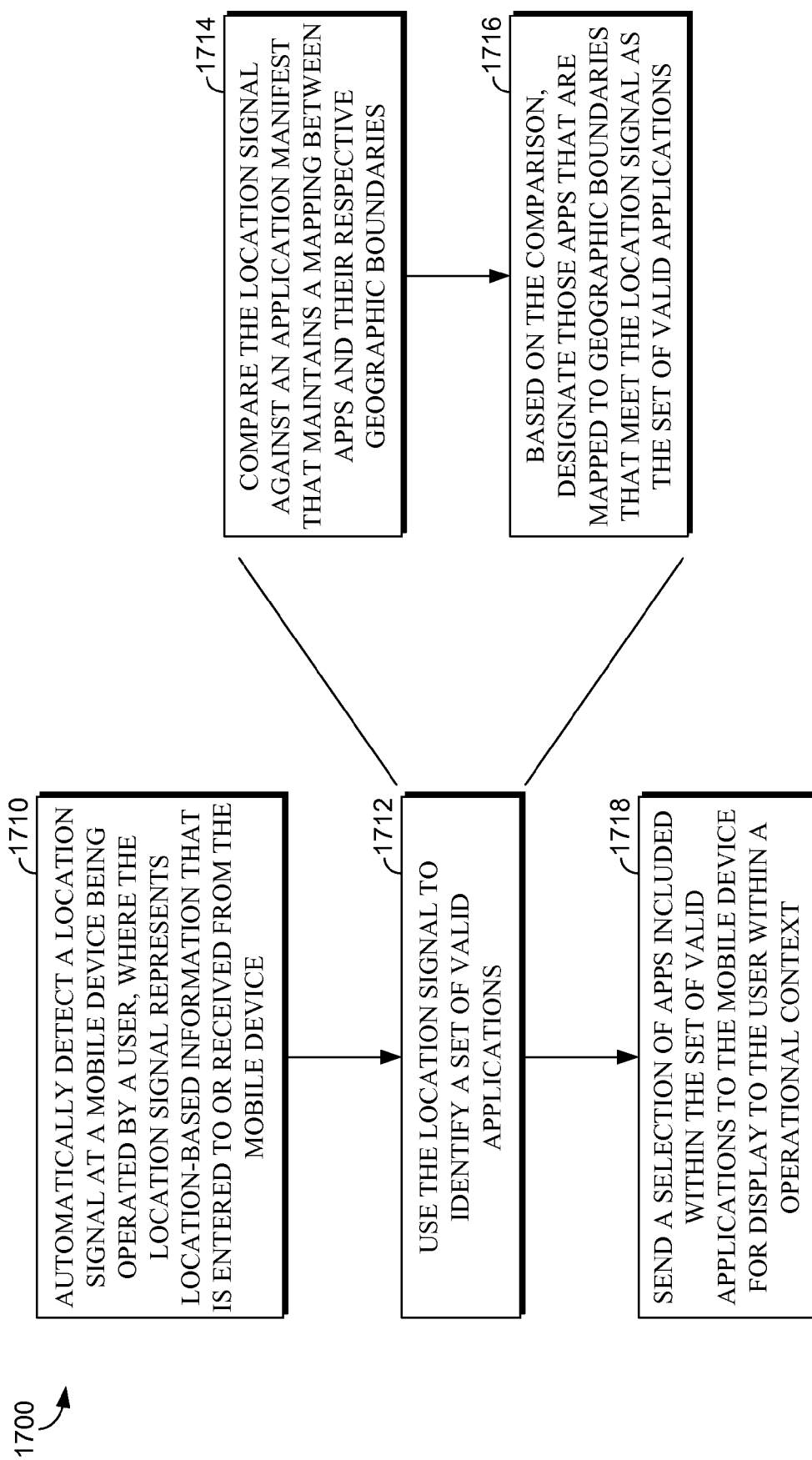
FIG. 17 is an overall flow diagram of a method for surfacing one or more applications using location-based information, in accordance with embodiments of the invention.

With reference to FIG. 17, an overall flow diagram of a method 1700 for surfacing one or more applications using location-based information is shown, in accordance with embodiments of the invention. Initially, the method 1700 comprises the steps of automatically detecting a location signal at a mobile device being operated by a user (see block 1710) and using the location signal to identify a set of valid applications. In embodiments, the location signal represents the location-based information that is entered to or received from the mobile device (see block 1712). In a particular instance, the process of identifying the set of valid applications using the location signal comprises the following steps: comparing the location signal against an application manifest that maintains a mapping between apps and their respective geographic boundaries (see block 1714); and, based on the comparison, designating those apps that are mapped to geographic boundaries that meet the location signal as the set of valid applications (see block 1716). Upon identifying the set of valid applications, the method 1700 may further involve sending a selection of apps included within the set of valid applications to the mobile device for display to the user within a operational context, as indicated at block 1718.

In other instances, the method 1700 may involve automatically detecting a task signal at the mobile device. Generally, the task signal represents the task-based information being entered or received at the mobile device. In operation, the task signal may be used to identify a set of relevant applications. For example, identifying the set of relevant applications may include the following steps: comparing the task signal against the application manifest that maintains a mapping between apps and their respective categories; and, based on the comparison, designating those apps that are mapped to categories that meet the task signal as the set of relevant applications. Accordingly, the selected apps may represent a group of apps that are common to both the set of relevant applications and the set of valid applications.

Figure 18:
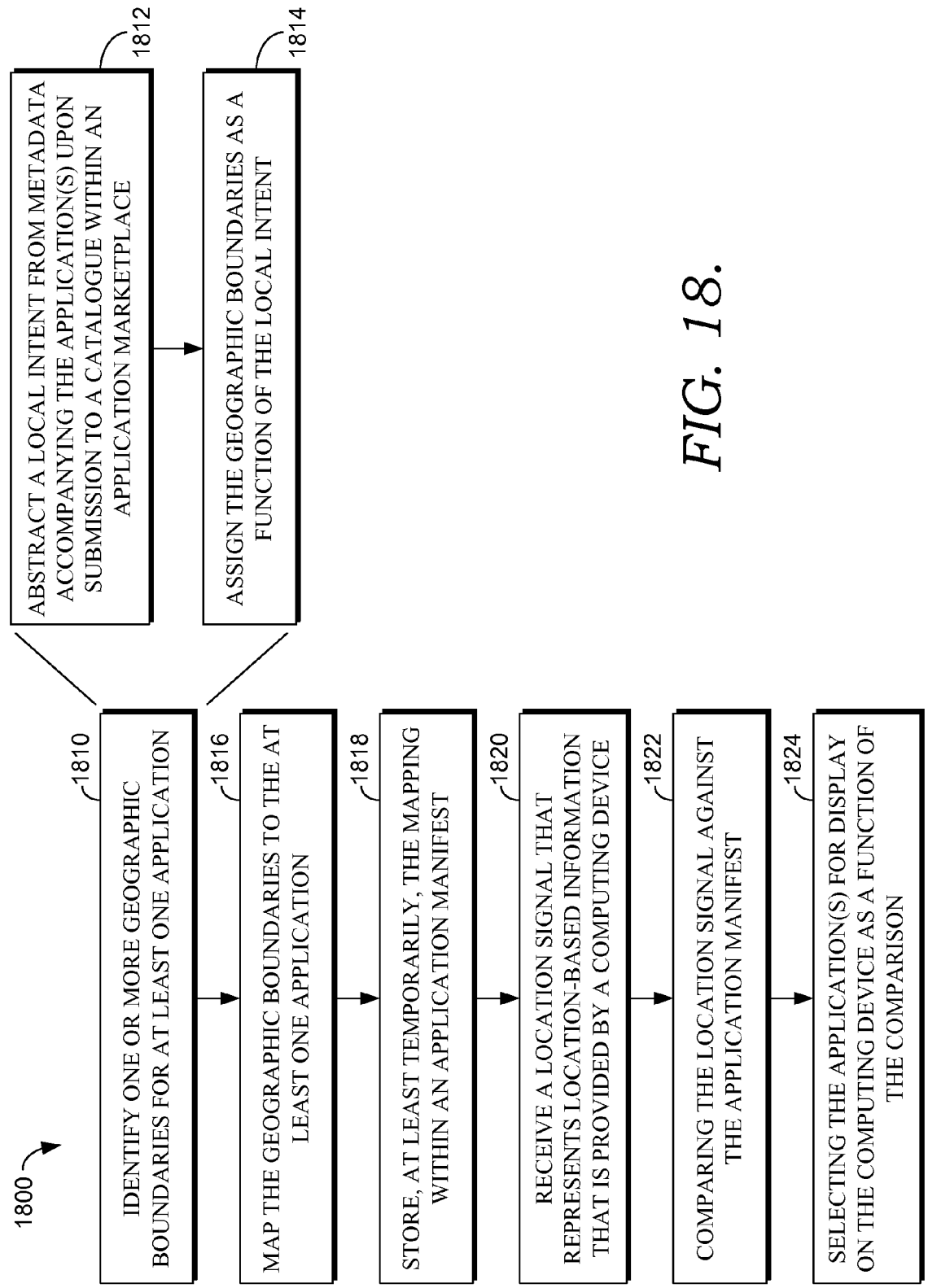
FIG. 18 is an overall flow diagram of a method for selecting at least one application to present on a display area of a computing device, in accordance with embodiments of the invention.

Turning now to FIG. 18, an overall flow diagram of a method 1800 for selecting at least one application to present on a display area of a computing device is shown, in accordance with embodiments of the invention. The method 1800 generally involves selecting at least one application to present on a display area of a computing device. In one instance, the method 1800 includes identifying one or more geographic boundaries for the application(s), as indicated at block 1810. Particularly, the process of identifying comprises the following steps: abstracting a local intent from metadata accompanying the application(s) upon submission to a catalogue within an application marketplace (see block 1812); and assigning the one or more geographic boundaries as a function of the local intent (see block 1814).

In certain instances, the metadata may include a name or description that specifies or inherently relates to location associated with the application(s). In this instance, assigning the geographic boundaries as a function of the local intent involves implicitly tagging the application(s) with the geographic boundaries that correspond with the specified or inherent location.

The method 1800 may additionally involve mapping the geographic boundaries to the application(s) (see block 1816), and storing the mapping within an application manifest (see block 1818). In one instance, mapping the geographic boundaries to the application(s) comprises directly mapping the application(s) to the specified location. In another instance, mapping the geographic boundaries to the application(s) comprises indirectly mapping the application(s) to the inherent location.

At some later time, as indicated at block 1820, a location signal may be received from the computing device (e.g., mobile handset), where the location signal represents location-based information that is provided by the computing device. Typically, the location signal is compared against the application manifest (see block 1822) and the application(s) are selected for display on the computing device as a function of the comparison (see block 1824).

In other embodiments, the method 1800 may involve detecting that a developer submitted a particular location associated with the application(s). In this embodiment, assigning the geographic boundaries as a function of the local intent includes explicitly tagging the application(s) with the geographic boundaries that correspond with the particular location. \

The method 1800 may also involve collecting telemetry data of the computing device. In embodiments, telemetry data captures locations at which users access, download, or launch the at least one app. Once the telemetry data is collected from the various users, the application(s) may be mapped to geographic locations that correspond with the telemetry data.

Various embodiments of the invention have been described to be illustrative rather than restrictive. Alternative embodiments will become apparent from time to time without departing from the scope of embodiments of the inventions. It will be understood that certain features and subcombinations are of utility and may be employed without reference to other features and subcombinations. This is contemplated by and is within the scope of the claims.

The invention claimed is:

1. One or more computer-storage media having embodied thereon computer-executable instructions that, when executed, perform a method for surfacing one or more applications using location-based information, the method comprising:
    automatically detecting a location signal at a mobile device being operated by a user, wherein the location signal represents the location-based information that is entered to or received from the mobile device;
    using the location signal to identify a set of valid applications, the applications in the set of valid applications being created prior to detection of the location signal at the mobile device, wherein the process of identifying the set of valid applications comprises:
        (a) comparing the location signal against an application manifest that maintains a mapping between the applications and their respective geographic boundaries;
        (b) based on the comparison, designating the applications that are mapped to geographic boundaries that meet the location signal as the set of valid applications; and
    sending a selection of the applications included within the set of valid applications to the mobile device for display to the user within an operational context.

2. The one or more computer-storage media of claim 1, wherein the operational context involves presenting the selection of the applications of the set of valid applications on a user-interface (UI) display in response to the query entered during an online search.

3. The one or more computer-storage media of claim 2, wherein presenting the selection of the applications of the set of valid applications comprises:
    integrating the selection of the applications within the initial set of search results; and surfacing the at least one of the selection of the applications concurrently with the initial set of search results on the UI display.

4. The one or more computer-storage media of claim 1, wherein the operational context involves presenting the selection of the applications of the set of valid applications on a locked home screen of the mobile device, wherein the locked home screen is encountered upon initially powering up the mobile device prior to user login.

5. The one or more computer-storage media of claim 1, wherein the operational context involves presenting the selection of the applications of the set of valid applications on an unlocked home screen of the mobile device, wherein the unlocked home screen is encountered upon the user logging in after powering up the mobile device.

6. The one or more computer-storage media of claim 1, wherein the operational context involves presenting the selection of the applications of the set of valid applications on a place-centered page, wherein the place-centered page is published upon the user conducting an online search for a particular location, landmark, attraction, or point of interest.

7. The one or more computer-storage media of claim 1, wherein the operational context involves presenting the selection of the applications of the set of valid applications on a local-centered page, wherein the local-centered page is published upon the recognizing a location of the user by monitoring geographic positioning of the mobile device.

8. The one or more computer-storage media of claim 7, wherein the local-centered page exposes content that describes businesses that are physically proximate to the location of the user.

9. The one or more computer-storage media of claim 1, wherein the method further comprises automatically detecting a task signal at the mobile device, wherein the task signal represents the task-based information being entered or received at the mobile device.

10. The one or more computer-storage media of claim 9, wherein the method further comprises using the task signal to identify a set of relevant applications.

11. The one or more computer-storage media of claim 10, wherein the method further comprises wherein identifying the set of relevant applications comprises:
   comparing the task signal against the application manifest that maintains a mapping between the applications and their respective categories; and
   based on the comparison, designating the applications that are mapped to categories that meet the task signal as the set of relevant applications.

12. The one or more computer-storage media of claim 11, wherein the selected applications represent a group of applications that are common to both the set of relevant applications and the set of valid applications.

13. A computer system for identifying a set of valid applications upon receiving location-based and task-based information from a mobile device, the computer system comprising:
   a data store for hosting an application manifest comprising a listing of applications mined from an application marketplace, wherein the applications within the listing are mapped to respective geographic boundaries and categories;
   the mobile device for providing a location signal and a task signal, wherein the location signal represents location-based information entered by a user of the mobile device or derived from a geographic position of the mobile device, and wherein the task signal represents task-based information that exposes user-initiated operations performed on the mobile device; and
   a processing device for receiving the location signal and the task signal from the mobile device, for comparing the location signal against the application manifest to identify a first set of applications mapped to geographic boundaries that are valid with respect to the location signal, for comparing the task signal against the application manifest to identify a second set of applications mapped to categories that are relevant with respect to the task signal, and for selecting applications from an overlapping set of applications from the first set of applications and the second set of applications, the applications in the overlapping set of applications being created prior to location signal is provided by the mobile device.

14. A computerized method carried out by a processing unit for selecting at least one application to present on a display area of a computing device, the method comprising:
   identifying one or more geographic boundaries for one or more applications, wherein the process of identifying comprises:
      (a) abstracting a local intent from metadata accompanying the one or more applications upon submission to a catalogue within an application marketplace;
      (b) assigning the one or more geographic boundaries as a function of the local intent;
   mapping the one or more geographic boundaries to the one or more applications application;
   storing, at least temporarily, the mapping within an application manifest;
   receiving a location signal that represents location-based information that is provided by the computing device;
   comparing the location signal against the application manifest; and
   selecting the at least one application from the one or more applications for display on the computing device as a function of the comparison, the at least one selected application being created prior to the location signal is provided by the computing device.

15. The method of claim 14, further comprising detecting that a developer submitted a particular location associated with the one or more applications, and wherein assigning the one or more geographic boundaries as a function of the local intent comprises explicitly tagging the one or more applications with the one or more geographic boundaries that correspond with the particular location.

16. The method of claim 14, wherein the metadata includes a name or description that specifies or inherently relates to location associated with the one or more applications, and wherein assigning the one or more geographic boundaries as a function of the local intent comprises implicitly tagging the one or more applications with the one or more geographic boundaries that correspond with the specified or inherent location.

17. The method of claim 16, wherein mapping the one or more geographic boundaries to the one or more applications comprises directly mapping the one or more applications to the specified location.

18. The method of claim 16, wherein mapping the one or more geographic boundaries to the one or more applications comprises indirectly mapping the one or more applications to the inherent location.

19. The method of claim 14, further comprising collecting telemetry data that captures locations at which users access, download, or launch the at least one app.

20. The method of claim 19, further comprising mapping the one or more applications to geographic locations that correspond with the telemetry data.

\* \* \* \* \*